United States Patent
Sugano et al.

(10) Patent No.: US 12,134,976 B2
(45) Date of Patent: Nov. 5, 2024

(54) FLUID CONTROL VALVE AND VALVE TIMING CHANGING DEVICE

(71) Applicant: MIKUNI CORPORATION, Tokyo (JP)

(72) Inventors: Kouji Sugano, Kanagawa (JP); Tetsuya Sasaki, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/154,851

(22) Filed: Jan. 16, 2023

(65) Prior Publication Data
US 2023/0279791 A1    Sep. 7, 2023

(30) Foreign Application Priority Data

Mar. 7, 2022 (JP) ................................. 2022-034820

(51) Int. Cl.
*F01L 1/344* (2006.01)
*F01L 1/356* (2006.01)
(Continued)

(52) U.S. Cl.
CPC ............. *F01L 1/3442* (2013.01); *F01L 1/356* (2013.01); *F16K 31/48* (2013.01);
(Continued)

(58) Field of Classification Search
CPC ........... F01L 1/3442; F01L 2001/34426; F01L 1/047; F01L 1/356; F01L 2001/34433;
(Continued)

(56) References Cited

U.S. PATENT DOCUMENTS 894,286 A * 7/1908 Reineking ............... F02M 21/00
                                                       123/585
4,305,424 A * 12/1981 Wankel ................. F04C 29/128
                                                       137/512.15
(Continued)

FOREIGN PATENT DOCUMENTS

CN    104454062 A  *  3/2015
DE    102007035671 A1 * 1/2009
(Continued)

OTHER PUBLICATIONS

EP-3530891-A1, English Language Machine Translation (Year: 2012).*
(Continued)

*Primary Examiner* — Wesley G Harris
(74) *Attorney, Agent, or Firm* — JCIPRNET

(57) ABSTRACT

A fluid control valve includes: a sleeve in a bottomed cylindrical shape, including an inlet, communication ports, an inner peripheral surface, and an inflow annular groove recessed from the inner peripheral surface in a region facing the inlet; a spool slidably disposed on the inner peripheral surface in the sleeve to open and close the communication ports; a C-shaped leaf spring formed by bending a leaf spring into an annular shape with two ends facing each other to form a notch and disposed in the inflow annular groove capable of being contracted in diameter to open and close the inlet; and a restricting part provided on the sleeve for restricting diameter contraction of the C-shaped leaf spring beyond a predetermined inner diameter and for restricting a position of the notch in a region away from the inlet.

13 Claims, 28 Drawing Sheets

(51) Int. Cl.
*F16K 31/48* (2006.01)
*F16K 31/524* (2006.01)
*F16K 11/07* (2006.01)
*F16K 15/02* (2006.01)
*F16K 15/14* (2006.01)

(52) U.S. Cl.
CPC .................. *F16K 31/52483* (2013.01); *F01L 2001/34426* (2013.01); *F01L 2001/3443* (2013.01); *F01L 2001/34433* (2013.01); *F16K 11/0716* (2013.01); *F16K 15/028* (2013.01); *F16K 15/142* (2013.01)

(58) Field of Classification Search
CPC ............... F01L 1/46; F01L 2001/34423; F01L 2001/3443; F16K 31/48; F16K 31/52483; F16K 15/1402
USPC .............................................. 137/860, 512.4
See application file for complete search history.

(56) References Cited

U.S. PATENT DOCUMENTS

| | | | | |
|---|---|---|---|---|
| 5,729,899 | A * | 3/1998 | Kaywood | F16D 1/072 29/523 |
| 6,475,011 | B1 * | 11/2002 | Sinha | H05K 3/325 439/330 |
| 7,000,580 | B1 * | 2/2006 | Smith | F01L 1/3442 123/90.31 |
| 8,225,818 | B1 * | 7/2012 | Stephens | F16K 11/0716 137/625.68 |
| 2006/0000432 | A1 * | 1/2006 | Yamamoto | F01L 1/46 123/90.22 |
| 2014/0311333 | A1 * | 10/2014 | Hutzelmann | F01L 1/3442 91/418 |
| 2015/0218977 | A1 * | 8/2015 | Hofmann | F01L 1/3442 123/90.17 |

FOREIGN PATENT DOCUMENTS

| | | | |
|---|---|---|---|
| DE | 102010018200 A1 | * | 10/2011 |
| DE | 102013104031 A1 | * | 10/2014 |
| EP | 1291563 A2 | * | 3/2003 |
| EP | 2363579 A1 | * | 9/2011 |
| EP | 2466081 A1 | * | 6/2012 |
| EP | 3530891 A1 | * | 8/2019 |
| JP | 2009138599 A | * | 6/2009 |
| JP | 2020128783 | | 8/2020 |
| JP | 2020128785 | | 8/2020 |
| JP | 2020159203 | | 10/2020 |
| WO | WO-2015037351 A1 | * | 3/2015 |
| WO | WO-2018135586 A1 | * | 7/2018 ............. F01L 1/344 |
| WO | WO-2018194076 A1 | * | 10/2018 |

OTHER PUBLICATIONS

DE-102013104031-A1, English Language Machine Translation (Year: 2014).*

* cited by examiner

FLUID CONTROL VALVE AND VALVE TIMING CHANGING DEVICE

CROSS-REFERENCE TO RELATED APPLICATION

This application claims the priority benefit of Japan application serial no. 2022-034820, filed on Mar. 7, 2022. The entirety of the above-mentioned patent application is hereby incorporated by reference herein and made a part of this specification.

BACKGROUND

Technical Field

The disclosure relates to a fluid control valve and a valve timing changing device for an internal combustion engine using the fluid control valve.

Description of Related Art

A conventional fluid control valve is known which includes a sleeve that has an inlet for inflow of hydraulic oil and an outlet for outflow of hydraulic oil, a spool that reciprocates within the sleeve, a biasing spring that biases the spool in one direction of movement, and an annular leaf spring or the like as a check valve that is partially wound so as to contract the diameter by elastic deformation and is disposed in close contact with the inner peripheral wall of the sleeve to open and close the inlet. (See, for example, Patent Literature 1, Patent Literature 2, and Patent Literature 3).

In the fluid control valve disclosed in Patent Literature 1, the annular leaf spring is provided with a protrusion, and the rotation of the annular leaf spring is restricted by engaging the protrusion of the annular leaf spring with a rotation restricting part provided on the sleeve. However, if the annular leaf spring receives the pressure (differential pressure) of the hydraulic oil and its diameter is excessively contracted, it may interfere with the spool moving inside the annular leaf spring and hinder the operation of the spool.

In the fluid control valve disclosed in Patent Literature 2, a structure is adopted in which the annular leaf spring does not get caught on the spool when the annular leaf spring tilts and contracts its diameter by defining the positional relationship between the stepped part of the sleeve and the stepped part of the spool.

However, if the annular leaf spring receives the pressure (differential pressure) of the hydraulic oil and its diameter is excessively contracted, it may interfere with the spool moving inside the annular leaf spring and hinder the operation of the spool.

In the fluid control valve disclosed in Patent Literature 3, a restricting part is provided on the sleeve so that the annular leaf spring as a check valve does not excessively contract its diameter. Since the annular leaf spring has a partially overlapped region, the expansion/contraction operation is not performed smoothly due to getting caught in the overlapped region, and sufficient sealing performance is not ensured, which may cause hydraulic oil leakage.

RELATED ART

Patent Literature

[Patent Literature 1] Japanese Patent Application Laid-Open No. 2020-128785

[Patent Literature 2] Japanese Patent Application Laid-Open No. 2020-159203

[Patent Literature 3] Japanese Patent Application Laid-Open No. 2020-128783

SUMMARY

Technical Problem

The disclosure has been made in view of the above circumstances, and the disclosure provides a fluid control valve and a valve timing changing device using the fluid control valve capable of preventing interference between an annular check valve and a spool, ensuring sealing performance and smooth operation, and achieving desired functions.

Solution to Problem

A fluid control valve according to the disclosure includes: a sleeve in a bottomed cylindrical shape, including an inlet into which fluid flows, a communication port that communicates with outside to allow the fluid to pass, a cylindrical inner peripheral surface centered on an axis, and an inflow annular groove that is recessed from the inner peripheral surface in a region facing the inlet; a spool slidably disposed on the inner peripheral surface in the sleeve to open and close the communication port; a C-shaped leaf spring which is formed by bending a leaf spring into an annular shape with two ends facing each other to form a notch with a predetermined gap and which is disposed in the inflow annular groove to be able to be contracted in diameter to open and close the inlet; and a restricting part provided on the sleeve for restricting diameter contraction of the C-shaped leaf spring beyond a predetermined inner diameter and for restricting a position of the notch in a region away from the inlet.

The above-described fluid control valve may adopt a configuration in which the C-shaped leaf spring is bent in advance to have an outer diameter larger than an inner diameter of the inflow annular groove.

The above-described fluid control valve may adopt a configuration in which the C-shaped leaf spring includes chamfered corners at the two ends.

The above-described fluid control valve may adopt a configuration in which the C-shaped leaf spring includes bent pieces bent radially inward at the two ends.

The above-described fluid control valve may adopt a configuration in which the restricting part is a fitting pin fitted to the sleeve to protrude radially inward from a bottom surface of the inflow annular groove.

The above-described fluid control valve may adopt a configuration in which the sleeve includes, as the inlet, a first inlet and a second inlet that are spaced apart around the axis, and the restricting part is disposed so that the notch of the C-shaped leaf spring is positioned in a region away from the first inlet and the second inlet.

The above-described fluid control valve may adopt a configuration in which the sleeve includes a communication annular groove recessed from the inner peripheral surface in a region facing the communication port, and the C-shaped leaf spring has a width dimension in a direction of the axis larger than a width dimension of the communication annular groove.

The above-described fluid control valve may adopt a configuration in which the spool includes an end to which a drive shaft of an electromagnetic actuator engages and exerts a driving force.

The above-described fluid control valve may adopt a configuration which further includes a biasing spring disposed within the sleeve to bias the spool against the driving force of the drive shaft.

The above-described fluid control valve may adopt a configuration in which the sleeve includes, as the communication port, a first communication port and a second communication port located on two sides of the inlet in a direction of the axis, and the spool includes a rod that reciprocates within the sleeve, a first valve portion that is provided on the rod to open and close a passage between the inlet and the first communication port, and a second valve portion that is provided on the rod to open and close a passage between the inlet and the second communication port.

The above-described fluid control valve may adopt a configuration in which the sleeve includes a first discharge passage that communicates with the first communication port and is able to discharge fluid when the first valve portion is closed, and a second discharge passage that communicates with the second communication port and is able to discharge fluid when the second valve portion is closed.

The above-described fluid control valve may adopt a configuration in which the spool includes a compression spring disposed between the first valve portion and the second valve portion; the first valve portion includes a first fixed part fixed to the rod and having a first land capable of closing the first communication port and a first internal passage formed inside the first land, and a first movable part movably supported along the rod and having a first lid part for opening and closing the first internal passage; the second valve portion includes a second fixed part fixed to the rod and having a second land capable of closing the second communication port and a second internal passage formed inside the second land, and a second movable part movably supported along the rod and having a second lid part for opening and closing the second internal passage; and the compression spring is disposed to exert a biasing force to close the first lid part and to close the second lid part.

A valve timing changing device according to the disclosure is a valve timing changing device for changing opening and closing timing of an intake valve or an exhaust valve driven by a camshaft, and the valve timing changing device includes: a housing rotor that rotates coaxially with the camshaft; a vane rotor that defines an advance chamber and a retard chamber together with the housing rotor and that rotates integrally with the camshaft; and a fluid control valve for controlling supply and discharge of hydraulic oil with respect to the advance chamber and the retard chamber, and the fluid control valve includes a sleeve having an inlet, a first communication port and a second communication port, and a spool having a first valve portion and a second valve portion. The inlet of the fluid control valve is a supply port to which hydraulic oil is supplied. The first communication port of the fluid control valve is a retard port that communicates with the retard chamber. The second communication port of the fluid control valve is an advance port that communicates with the advance chamber.

The above-described valve timing changing device may adopt a configuration which further includes a fastening bolt that fastens the vane rotor to the camshaft. The fastening bolt is formed in a cylindrical shape and includes a passage through which hydraulic oil passes, and the fluid control valve is disposed inside the fastening bolt.

The above-described valve timing changing device may adopt a configuration in which the fluid control valve is a torque-driven and hydraulically-driven fluid control valve capable of reciprocating hydraulic oil between the retard chamber and the advance chamber by a fluctuating torque received by the camshaft and discharging a part of the supplied hydraulic oil.

The above-described valve timing changing device may adopt a configuration in which the spool is formed so that in a state where the spool is positioned in a retard mode in which the first valve portion is opened and the second valve portion is closed, when the camshaft receives a reverse torque, the second valve portion opens to allow hydraulic oil to flow from the advance port to the retard port, and in a state where the spool is positioned in an advance mode in which the first valve portion is closed and the second valve portion is opened, when the camshaft receives a forward torque, the first valve portion opens to allow hydraulic oil to flow from the retard port to the advance port.

The above-described valve timing changing device may adopt a configuration in which the spool is formed to block reciprocation of hydraulic oil between the retard chamber and the advance chamber in a state of being positioned in a neutral holding mode in which the first valve portion closes the retard port and the second valve portion closes the advance port.

Effects

According to the fluid control valve with the above configurations, interference between the C-shaped leaf spring and the spool may be prevented, and the sealing performance and smooth operation of the C-shaped leaf spring may be ensured, and desired functions may be achieved. Further, according to the valve timing changing device including the fluid control valve with the above configurations, it is possible to achieve a desired operation without causing a malfunction of the fluid control valve while achieving miniaturization of the device and the like.

DESCRIPTION OF EMBODIMENTS

Hereinafter, embodiments of the disclosure will be described with reference to the accompanying drawings.

Figure 1:
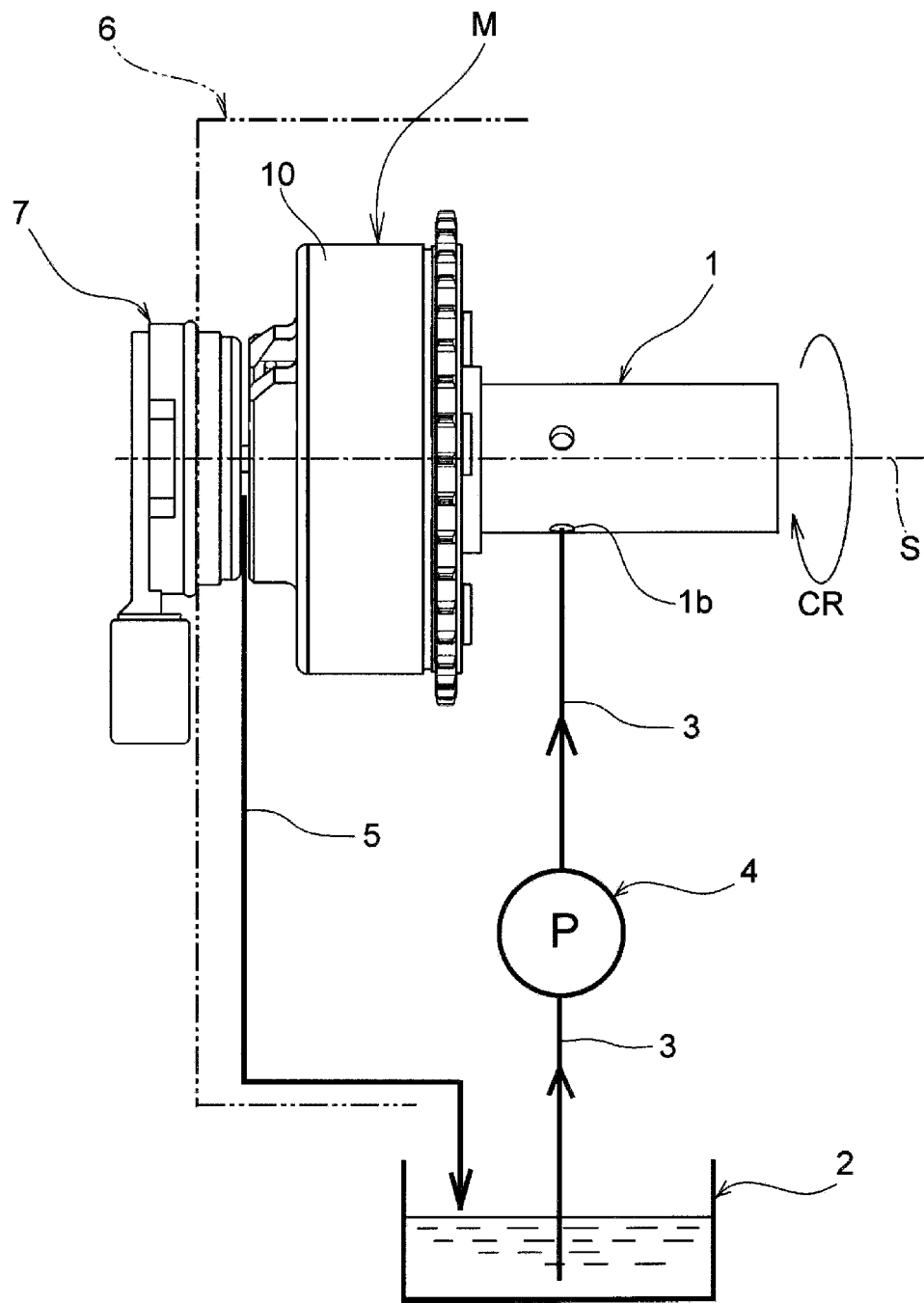
FIG. 1 is a schematic view showing the configuration of an engine to which a valve timing changing device including a fluid control valve of the disclosure is applied.
Figure 2:
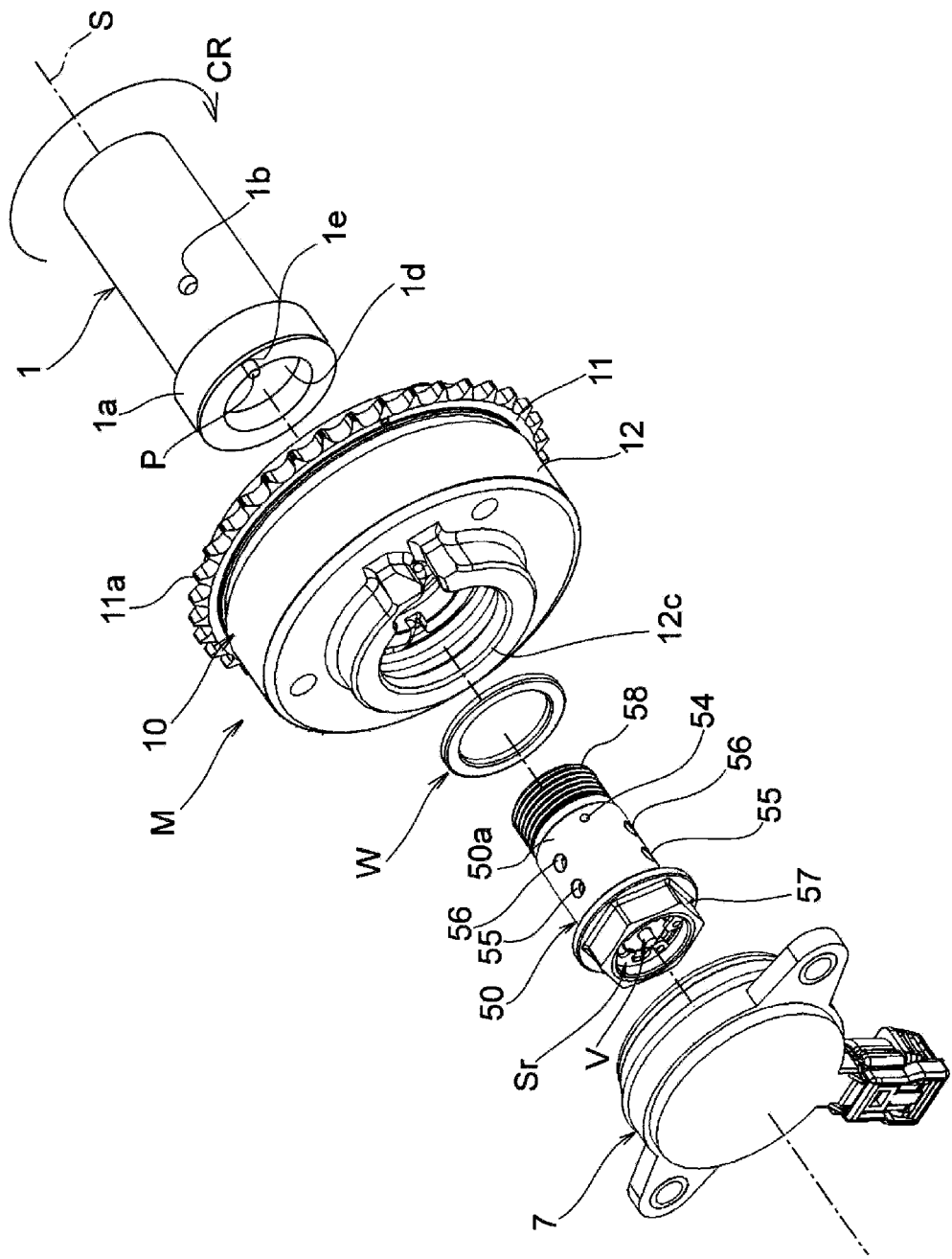
FIG. 2 is an exploded perspective view of the electromagnetic actuator, the fastening bolt with the built-in fluid control valve, the valve timing changing device, and the camshaft in the configuration shown in FIG. 1, as viewed obliquely from the front opposite to the camshaft side.

A valve timing changing device M including a fluid control valve V according to the disclosure, as shown in FIG. 1, is attached to a camshaft 1 of an internal combustion engine and changes the opening/closing timing, that is, the valve timing, of an intake valve or an exhaust valve driven by the camshaft 1.

The internal combustion engine includes the camshaft 1 that opens and closes an intake valve or an exhaust valve; an oil pan 2 that stores hydraulic oil; a supply passage 3 that supplies the hydraulic oil in the oil pan 2 toward the camshaft 1; an oil pump 4 provided in the middle of the supply passage 3 for sucking, pressurizing and discharging the hydraulic oil; a discharge passage 5 that returns hydraulic oil discharged from the fluid control valve V to the oil pan 2; a chain cover 6 that covers the valve timing changing device M; and an electromagnetic actuator 7 fixed to the chain cover 6.

The camshaft 1, as shown in FIGS. 1 to 7, rotates about an axis S in one direction CR, and includes a fitting shaft 1a, passages 1b and 1c, a female screw part 1d, and a fitting hole 1e into which a positioning pin P is fitted.

The supply passage 3 is formed in the cylinder block, cylinder head, and the like of the internal combustion engine.

The discharge passage 5 is defined between the cylinder block and cylinder head of the internal combustion engine and the chain cover 6 to return excess hydraulic oil discharged from the fluid control valve V back to the oil pan 2.

Figure 3:
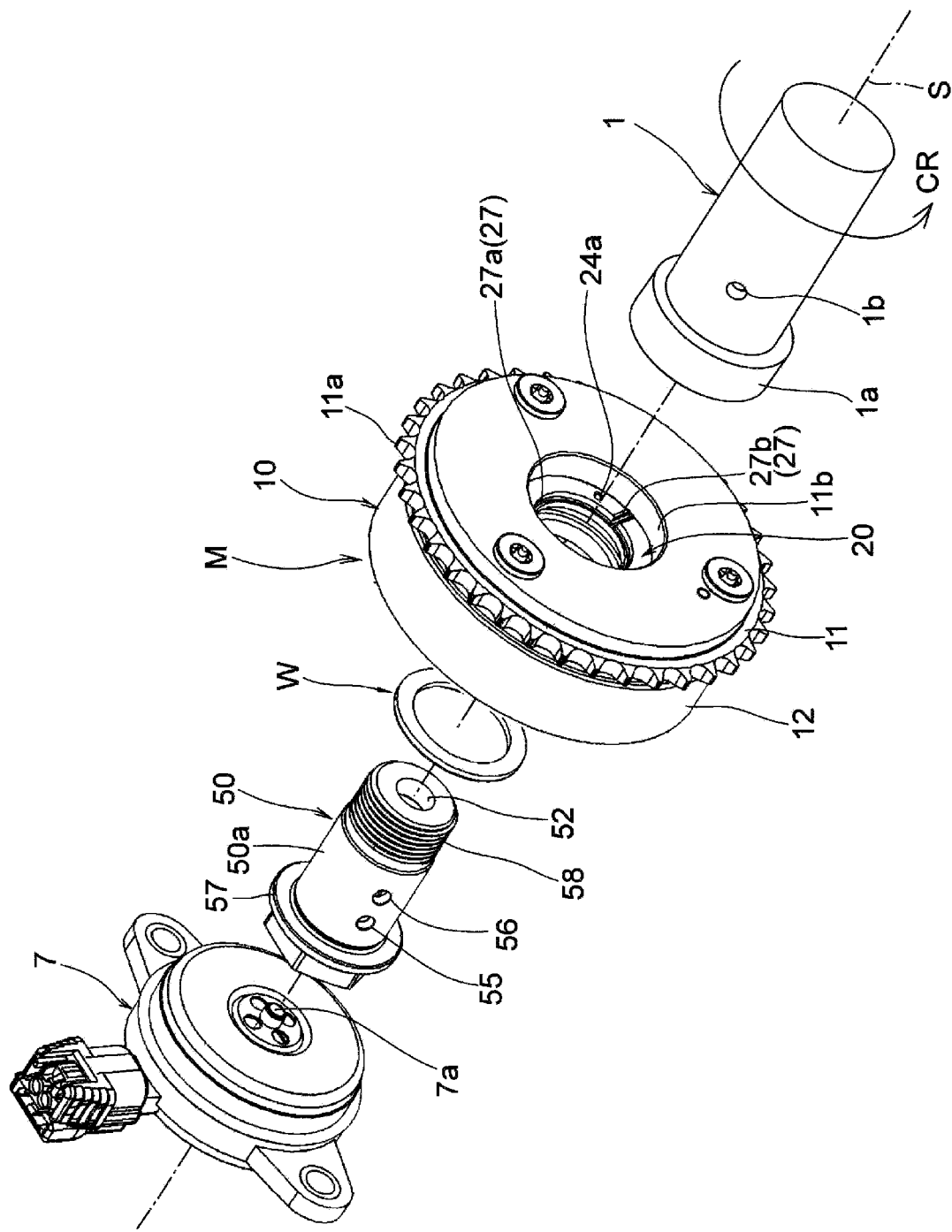
FIG. 3 is an exploded perspective view of the electromagnetic actuator, the fastening bolt with the built-in fluid control valve, the valve timing changing device, and the camshaft in the configuration shown in FIG. 1, as viewed obliquely from the back on the camshaft side.

The electromagnetic actuator 7 is fixed to the chain cover 6 and, as shown in FIG. 3, includes a drive shaft 7a that moves in the direction of the axis S and an excitation coil (not shown) that drives the drive shaft 7a.

As shown in FIGS. 2 to 7, the valve timing changing device M includes a housing rotor 10, a vane rotor 20, a rotation biasing spring 30, a lock mechanism 40, a fastening bolt 50, a filter member 60, the fluid control valve V, and a stopper member Sr.

Further, the fluid control valve V switches passages to control the flow of hydraulic oil, and includes a sleeve 70, a spool 80, a biasing spring 90, and a C-shaped leaf spring 100 functioning as a check valve.

The housing rotor 10 is rotatably supported on the axis S of the camshaft 1, interlocks with the rotation of the crankshaft via a chain, and transmits the rotational driving force of the crankshaft to the camshaft 1 via the vane rotor 20.

As shown in FIGS. 4 to 7, the housing rotor 10 has a two-piece structure including a disk-shaped first housing 11 and a bottomed cylindrical second housing 12 coupled to the first housing 11. The housing rotor 10 accommodates the vane rotor 20 to be relatively rotatable in the angle range between the most retarded position and the most advanced position, and defines an advance chamber AC and a retard chamber RC together with the vane rotor 20.

The first housing 11 includes a sprocket 11a, a fitting hole 11b, an inner wall surface 11c, a lock hole 11d, a recess 11e formed continuously with the lock hole 11d, three circular holes 11f through which screws b pass, and a positioning hole 11g into which a positioning pin P2 is fitted.

The fitting hole 11b is rotatably fitted to the fitting shaft 1a of the camshaft 1. The inner wall surface 11c is in slidable contact with a back surface 24 of the vane rotor 20. A lock pin 41 of the lock mechanism 40 is fitted into the lock hole 11d with a small gap. The recess 11e is formed around the lock hole 11d and guides hydraulic oil to a tip pressure receiving part 41a of the lock pin 41 fitted in the lock hole 11d.

As shown in FIGS. 4 to 7, the second housing 12 includes a cylindrical wall 12a, a front wall 12b, an opening 12c, three screw holes 12d into which screws b are screwed, three shoe parts 12e, a hooking groove 12f, a recess 12g, an annular joint part 12h joined to the inner wall surface 11c of the first housing 11, and a positioning hole 12i into which the positioning pin P2 is fitted.

The opening 12c forms a circular hole centered on the axis S through which the fastening bolt 50 is passed.

The three shoe parts 12e are formed on the inside of the front wall 12b to protrude from the cylindrical wall 12a toward the center and are disposed at equal intervals in the circumferential direction.

One shoe part 12e contacts the vane 22 of the vane rotor 20 to define the maximum retarded position, and another shoe part 12e contacts the vane 22 of the vane rotor 20 to define the maximum advanced position.

The hooking groove 12f is formed by cutting out a part of the opening 12c to hook a first end 32 of the rotation biasing spring 30. A part of a coil part 31 of the rotation biasing spring 30 is accommodated in the recess 12g.

The vane rotor 20 is disposed inside the housing rotor 10, defines the advance chamber AC and the retard chamber RC together with the housing rotor 10, is fixed to the camshaft 1 with the fastening bolt 50 with a washer W therebetween, and rotates integrally with the camshaft 1.

As shown in FIGS. 4 to 7, the vane rotor 20 includes a hub 21, three vanes 22, a front surface 23, an annular recess 23a, a hooking groove 23b, a back surface 24, a fitting hole 25, a recess 26, a groove passage 27, a retard passage 28, and an advance passage 29.

The vane 22 defines the advance chamber AC and the retard chamber RC together with the shoe part 12e of the housing rotor 10. The front surface 23 is disposed in slidable contact with the inner wall surface of the front wall 12b of the second housing 12. The annular recess 23a is formed by hollowing out the front surface 23 in an annular shape to accommodate a part of the coil part 31 of the rotation biasing spring 30. The hooking groove 23b is formed by hollowing out a part of the front surface 23 to hook a second end 33 of the rotation biasing spring 30 thereon.

The back surface 24 is formed on a plane perpendicular to the axis S, is joined to the end surface of the camshaft 1, and is disposed in slidable contact with the inner wall surface 11c of the first housing 11. Further, the back surface 24 is provided with a fitting hole 24a into which a positioning pin P to be assembled in the fitting hole 1e of the camshaft 1 is fitted. The fitting hole 25 is formed to have an inner diameter dimension such that a cylindrical part 50a of the fastening bolt 50 is closely fitted.

Figure 5:
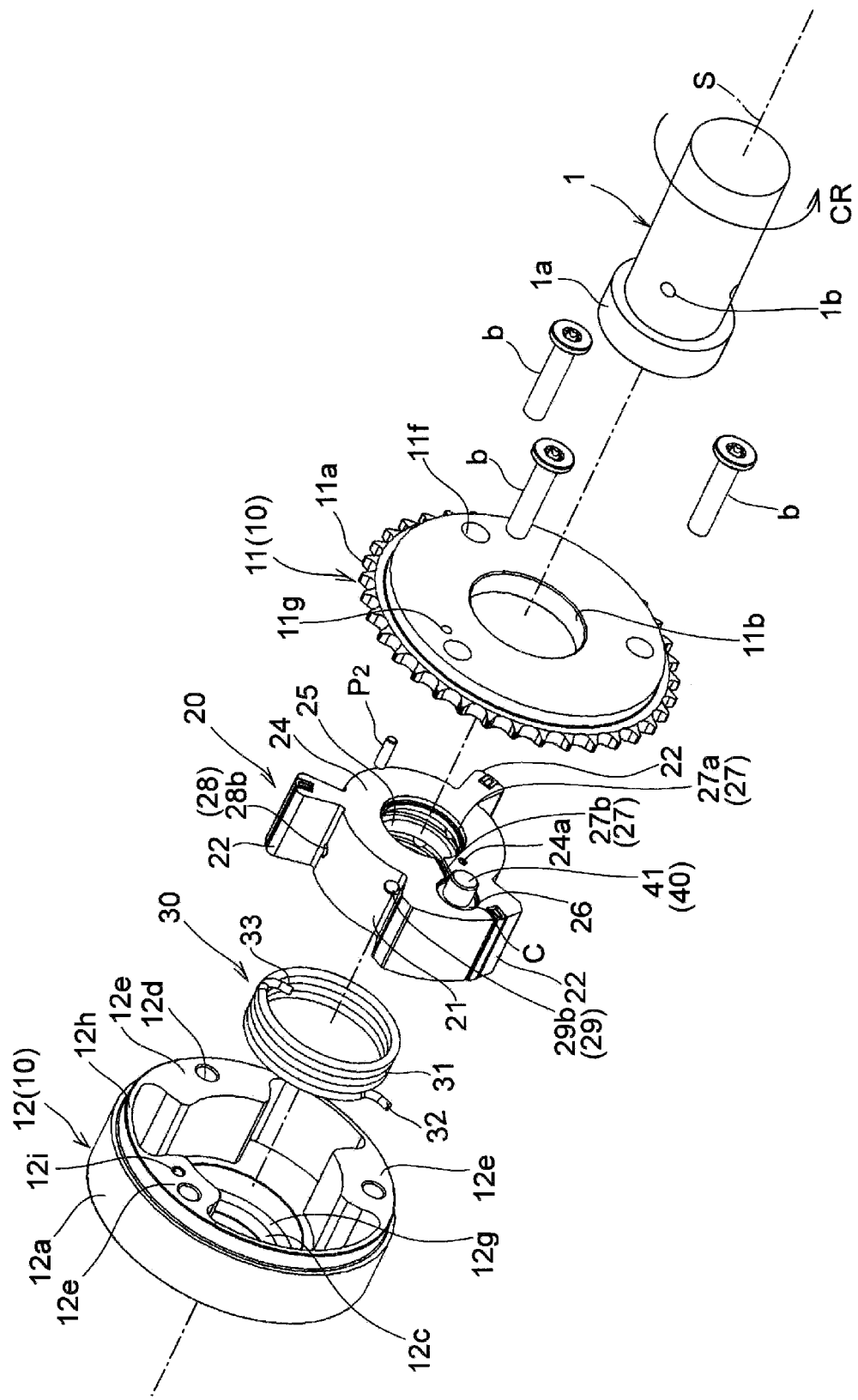
FIG. 5 is an exploded perspective view of the housing rotor, the vane rotor, the rotation biasing spring, and the camshaft included in the valve timing changing device of the disclosure, as viewed obliquely from the back on the camshaft side.
Figure 6:
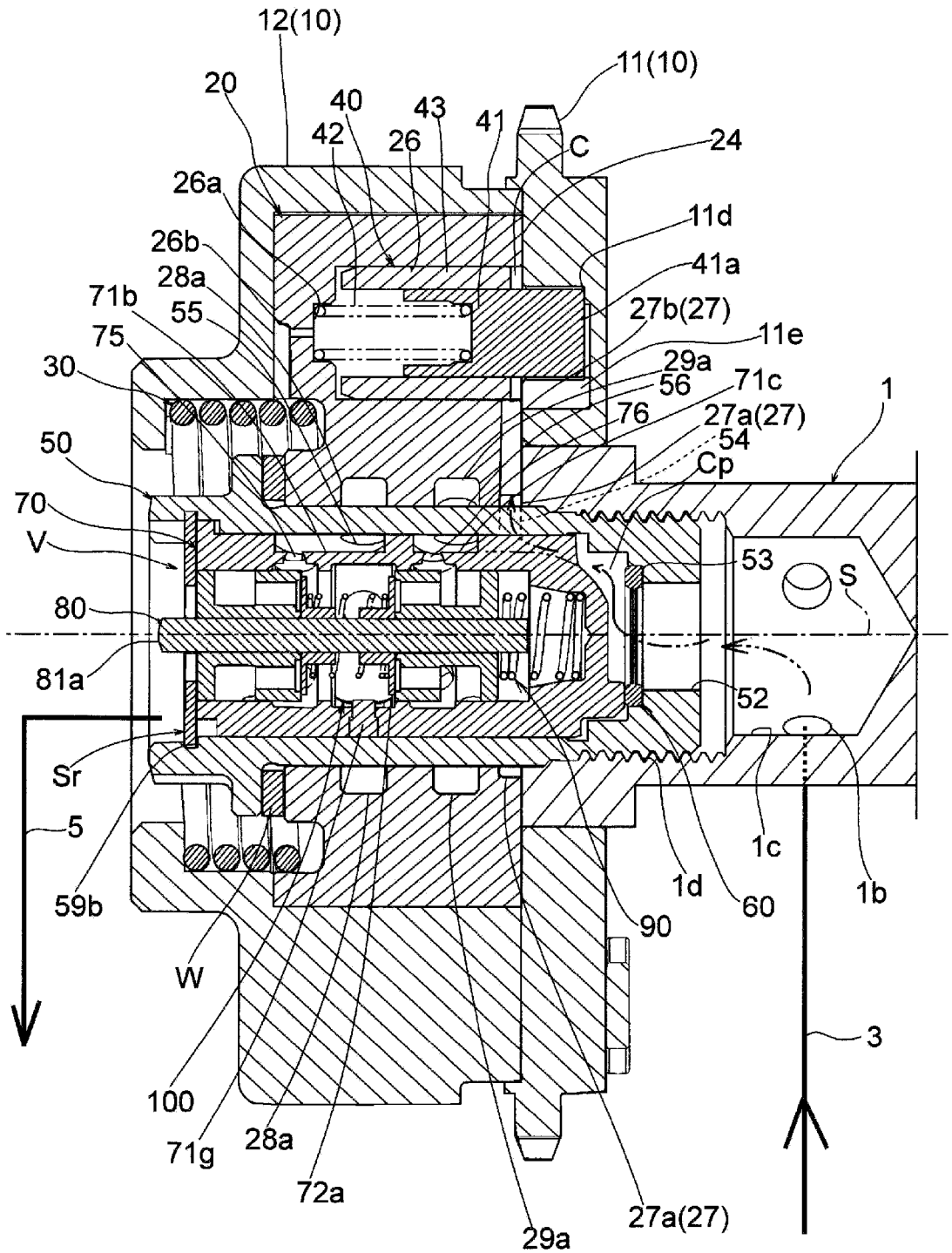
FIG. 6 is a cross-sectional view showing a locked state in which the lock mechanism is operated in a state in which the valve timing changing device of the disclosure is fastened and fixed to the camshaft by the fastening bolt.
Figure 7:
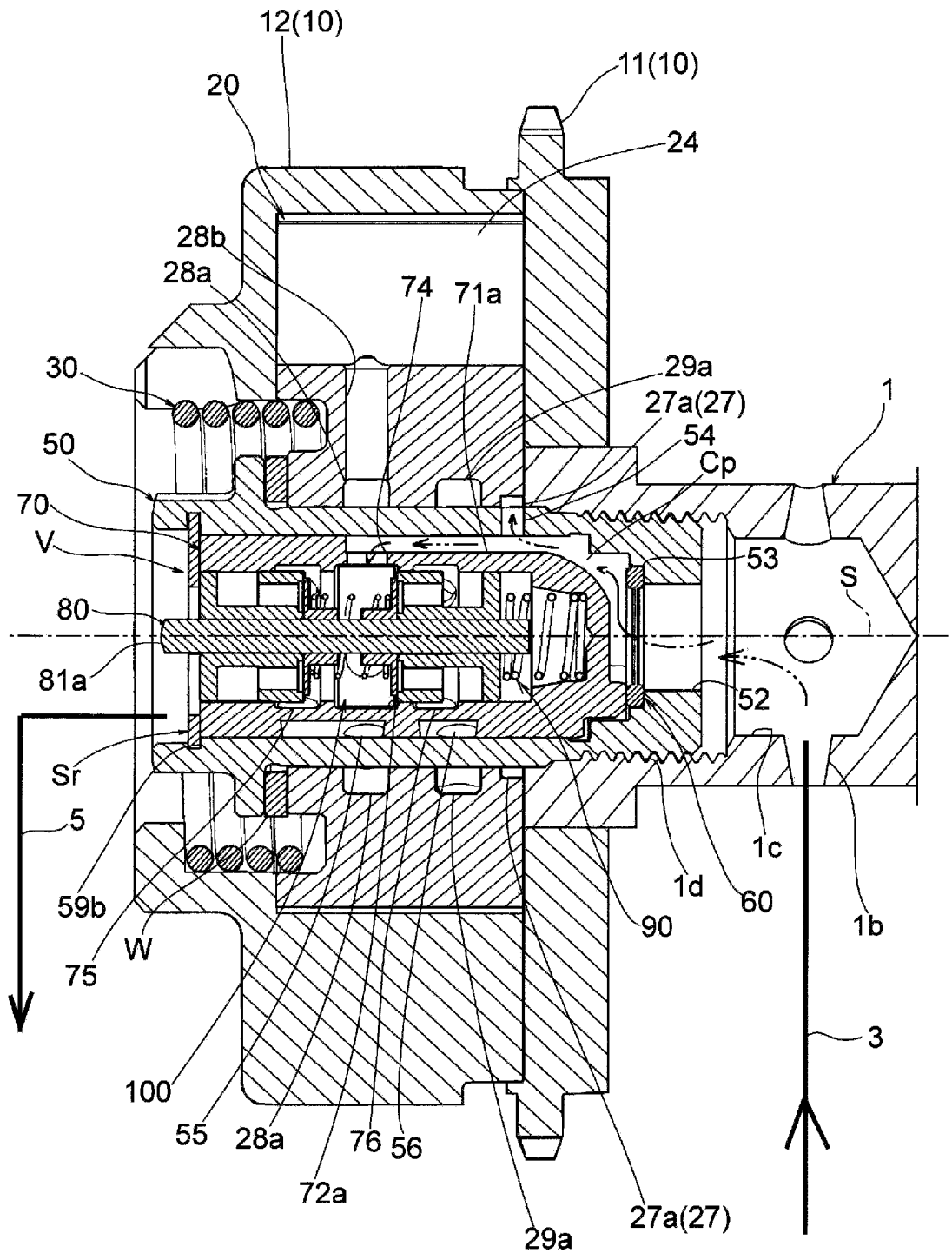
FIG. 7 is a cross-sectional view showing a passage in the region around the fluid control valve in a state in which the valve timing changing device of the disclosure is fastened and fixed to the camshaft by the fastening bolt.

As shown in FIGS. 5 and 6, the recess 26 is formed in one vane 22 to accommodate the lock mechanism 40, and includes a receiving part 26a for receiving a biasing spring 42 included in the lock mechanism 40, and a communication passage 26b communicating with the outside of the vane rotor 20.

The groove passage 27 is formed by an annular groove passage 27a and a straight groove passage 27b, and cooperates with the end surface of the camshaft 1 and the inner wall surface 11c of the housing rotor 10 to supply hydraulic oil to and discharge hydraulic oil from the lock mechanism 40. That is, the groove passage 27 serves to supply the hydraulic oil guided through a through passage 54 of the fastening bolt 50 to the lock mechanism 40 upstream of the fluid control valve V in the flow direction of the supplied hydraulic oil to release the lock and to discharge the hydraulic oil when locking. Since the groove passage 27 is formed in the back surface 24 of the vane rotor 20, it is easy to machine and provides lubrication to the sliding region of the inner wall surface 11c.

Figure 20:
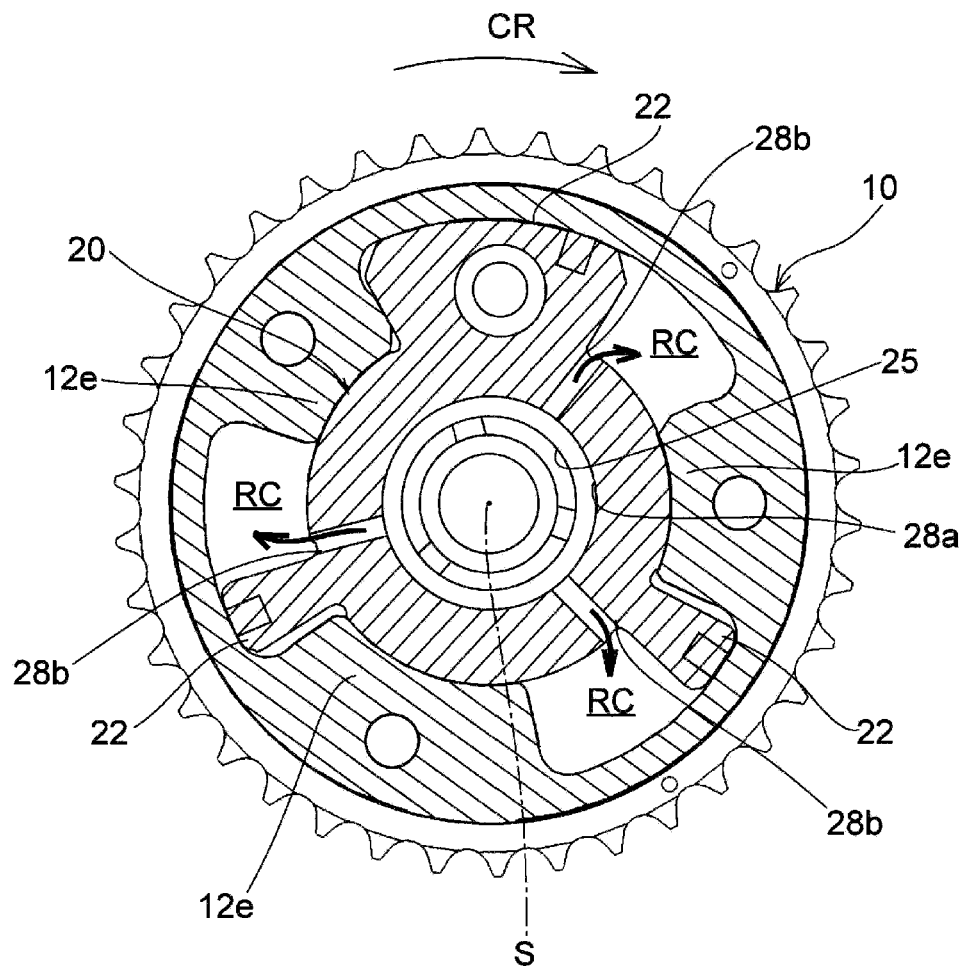
FIG. 20 is a cross-sectional view showing a state in which the vane rotor is positioned at the most retarded position with respect to the housing rotor.
Figure 21:
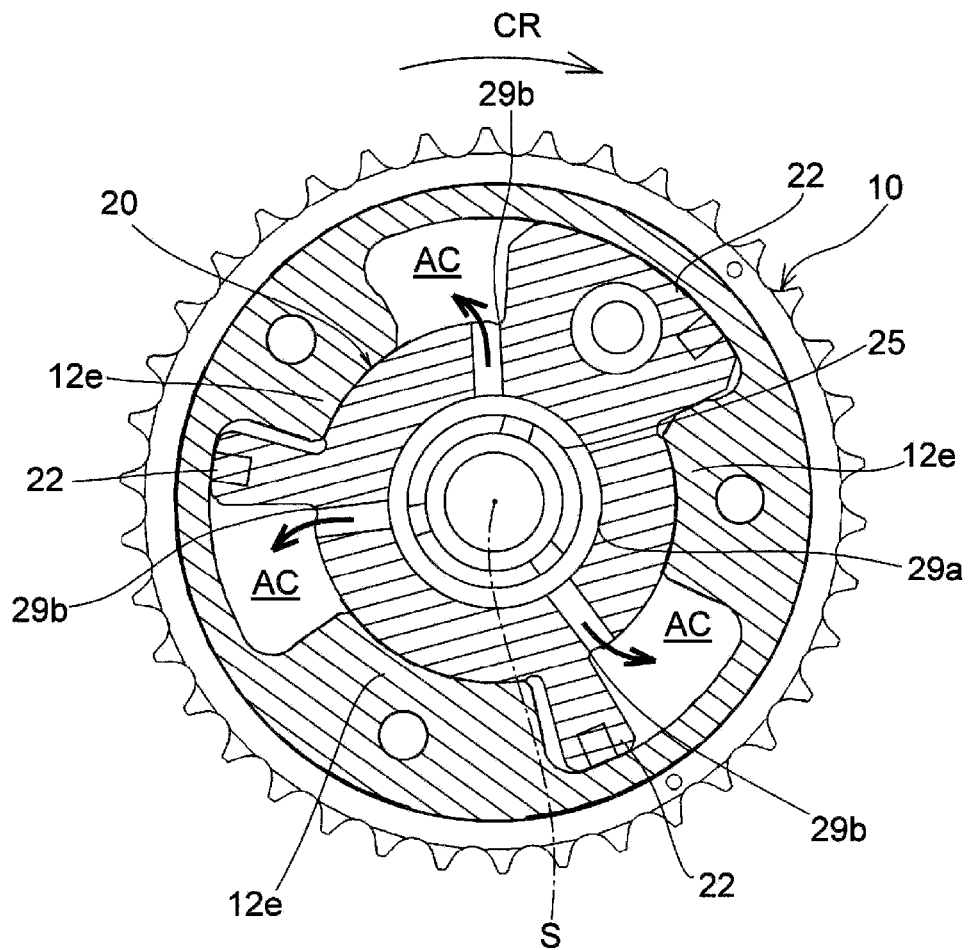
FIG. 21 is a cross-sectional view showing a state in which the vane rotor is positioned at the most advanced position with respect to the housing rotor.

The retard passage 28 supplies and discharges hydraulic oil to and from the retard chamber RC, and as shown in FIG. 20, is formed by an annular groove 28a formed in the inner peripheral surface of the fitting hole 25 and a through passage 28b radially penetrating the hub 21 from the annular groove 28a. The advance passage 29 supplies and discharges hydraulic oil to and from the advance chamber AC, and as shown in FIG. 21, is formed by an annular groove 29a formed in the inner peripheral surface of the fitting hole 25 and a through passage 29b radially penetrating the hub 21 from the annular groove 29a.

Figure 4:
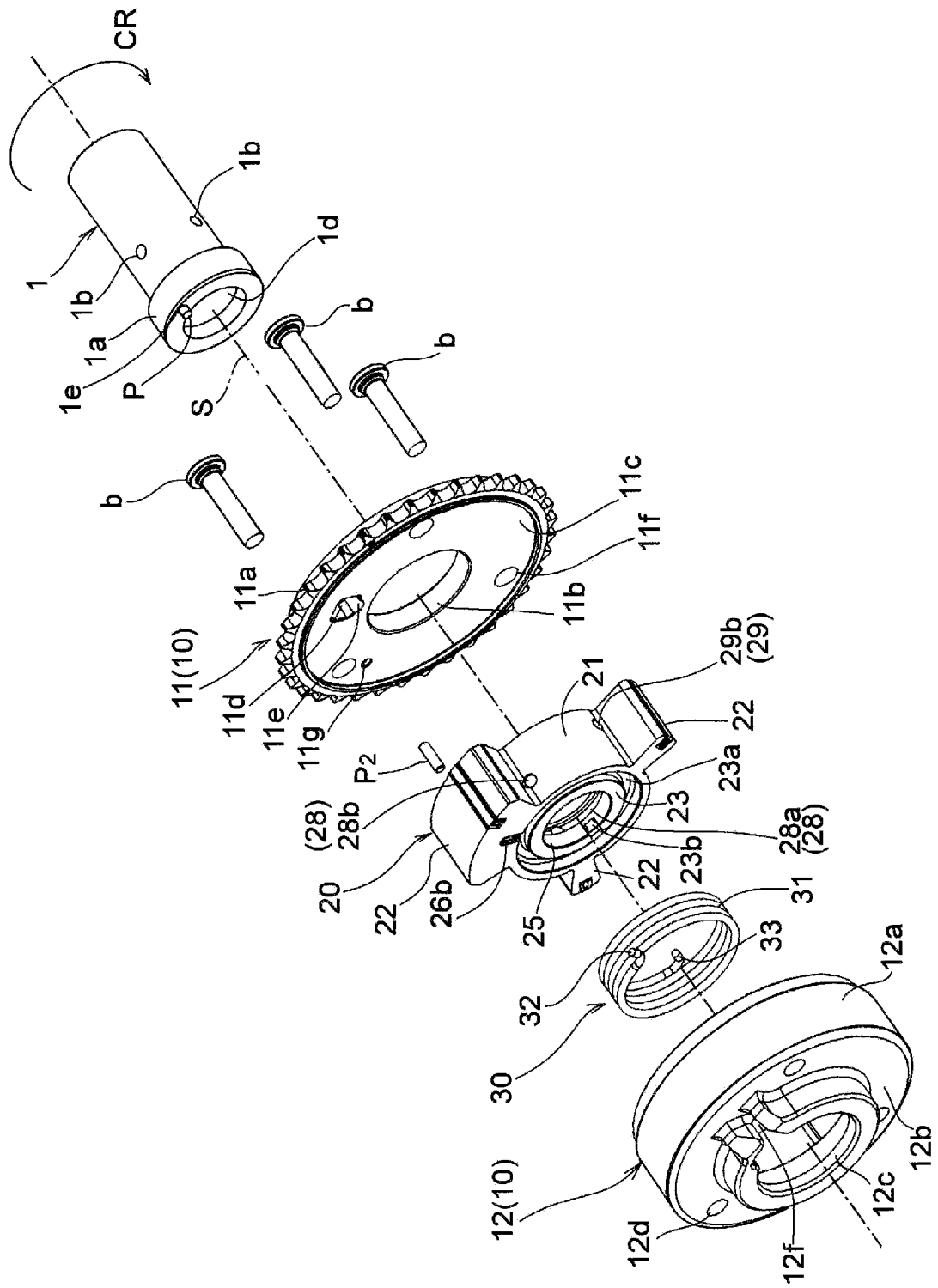
FIG. 4 is an exploded perspective view of the housing rotor, the vane rotor, the rotation biasing spring, and the camshaft included in the valve timing changing device of the disclosure, as viewed obliquely from the front opposite to the camshaft side.

The rotation biasing spring 30 is a coil spring including a coil part 31, a first end 32 and a second end 33, as shown in FIGS. 4 to 6.

The coil part 31 of the rotation biasing spring 30 is accommodated in the annular recess 23a of the vane rotor 20 and the recess 12g of the housing rotor 10, and the first end 32 is hooked by the hooking groove 12f of the housing rotor 10, and the second end 33 is hooked by the hooking groove 23b of the vane rotor 20. Thereby, the rotation biasing spring 30 rotationally biases the vane rotor 20 with respect to the housing rotor 10 in the advancing direction.

In this way, by adopting the rotation biasing spring 30 that biases in the advancing direction, it is possible to improve the responsiveness by assisting the operating torque when advancing. Further, controllability may be improved by setting the load of the rotation biasing spring 30 so that the difference between the operating torque and the load torque is substantially equal when advancing and retarding.

Figure 19:
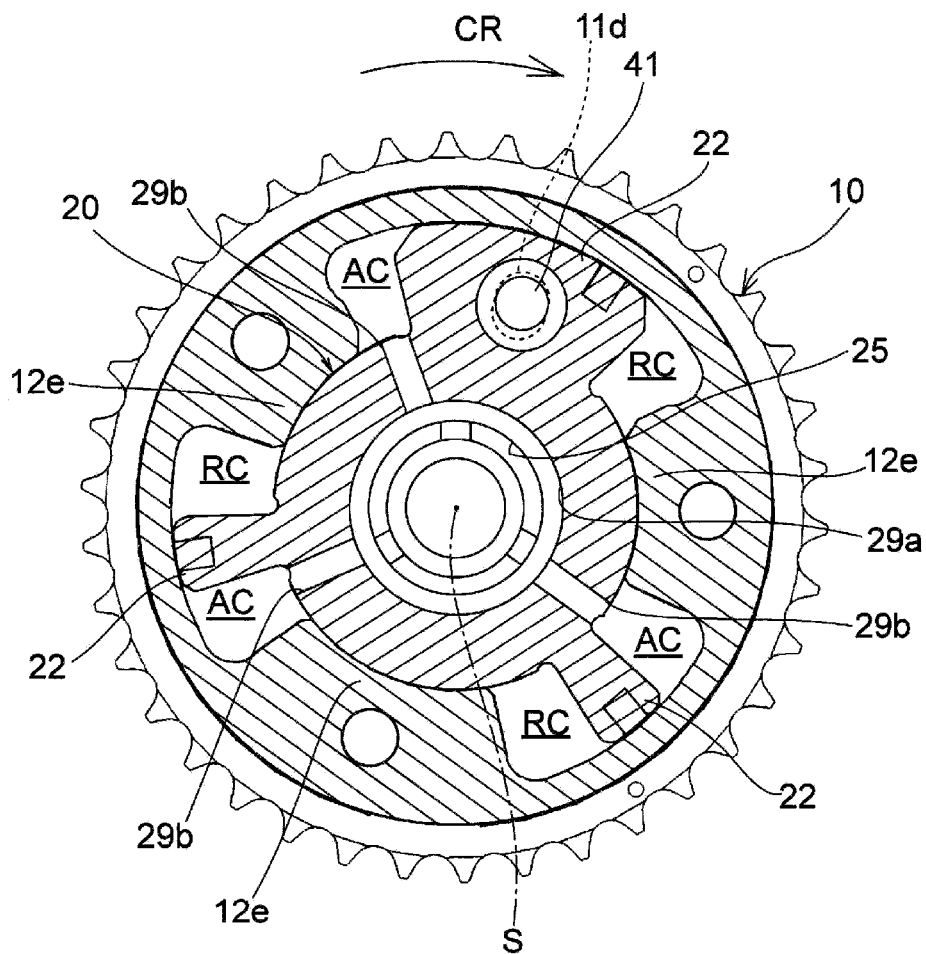
FIG. 19 is a cross-sectional view showing a state in which the vane rotor is locked in an intermediate position with respect to the housing rotor.

The lock mechanism 40 includes a lock pin 41, a biasing spring 42, and a cylindrical holder 43. As shown in FIG. 19, the lock mechanism 40 locks the vane rotor 20 with respect to the housing rotor 10 at an intermediate position between the most retarded position and the most advanced position.

The lock pin 41 has a substantially cylindrical shape and has a tip pressure receiving part 41a. The lock pin 41 is held in the direction of the axis S with respect to the back surface 24 of the vane rotor 20 to be retractable to fit into the lock hole 11d of the housing rotor 10. The biasing spring 42 biases the lock pin 41 in a protruding direction.

The cylindrical holder 43 is fitted and fixed in the recess 26 of the vane rotor 20 to reciprocally hold the lock pin 41 biased by the biasing spring 42. Further, as shown in FIGS. 5 and 6, the cylindrical holder 43 is disposed to be recessed from the back surface 24 of the vane rotor 20 to define an annular oil reservoir C communicating with the straight groove passage 27b around the lock pin 41. By providing the annular oil reservoir C, the region around the lock pin 41 is filled with hydraulic oil, and the lock may be released smoothly.

When the engine is started, hydraulic oil pressurized by the oil pump 4 is guided to the lock mechanism 40 through the passages 1b and 1c of the camshaft 1, a crevice passage Cp in the fastening bolt 50, the through passage 54 of the fastening bolt 50, the groove passage 27 and the annular oil reservoir C formed in the back surface 24 of the vane rotor 20, and when the hydraulic pressure applied to the tip pressure receiving part 41a of the lock pin 41 increases, the lock pin 41 is released from the lock hole 11d to release the lock.

In addition, when the hydraulic pressure of the supplied hydraulic oil decreases due to the engine stop, the hydraulic oil acting on the lock pin 41 flows out through the groove passage 27, the through passage 54, the crevice passage Cp, and the passages 1c and 1b, and the hydraulic pressure pressing the lock pin 41 decreases. Then, the lock pin 41 is biased by the biasing spring 42 to fit into the lock hole 11d of the housing rotor 10, and the vane rotor 20 is locked to the intermediate position with respect to the housing rotor 10.

As shown in FIGS. 2, 3 and 6 to 9, the fastening bolt 50 includes a cylindrical part 50a centered on the axis S, a fitting hole 51 for fitting the fluid control valve V, an opening 52, an annular receiving part 53, a through passage 54, a retard passage 55, an advance passage 56, a flanged head 57, a male screw part 58, a positioning recess 59a, and an annular groove 59b.

The cylindrical part 50a is formed to have an outer diameter dimension that allows it to be closely fitted into the fitting hole 25 of the vane rotor 20. The fitting hole 51 forms a cylindrical inner peripheral surface centered on the axis S. The opening 52 is formed in a circular hole with a diameter smaller than that of the fitting hole 51 and functions as a passage through which hydraulic oil passes. The annular receiving part 53 is formed so that the filter member 60 is fitted inside the opening 52. The through passage 54 introduces or discharges hydraulic oil to or from the lock mechanism 40, and penetrates in a radial direction perpendicular to the axis S in the cylindrical part 50a. The retard passage 55 extends through the cylindrical part 50a in a radial direction perpendicular to the axis S to communicate with the retard passage 28 of the vane rotor 20. The advance passage 56 extends through the cylindrical part 50a in a radial direction perpendicular to the axis S to communicate with the advance passage 29 of the vane rotor 20. The flanged head 57 contacts the front surface 23 of the vane rotor 20 with the washer W therebetween. The male screw part 58 is screwed onto the female screw part 1d of the camshaft 1. The positioning recess 59a is formed so that a positioning protrusion 79 of the sleeve 70 included in the fluid control valve V is fitted. The annular groove 59b is formed to fit the stopper member Sr.

The filter member 60, which catches foreign matter mixed in the hydraulic oil, is fitted into the annular receiving part 53 of the fastening bolt 50 and held by the sleeve 70 of the fluid control valve V.

The stopper member Sr is a snap ring that is fitted into the annular groove 59b of the fastening bolt 50 to press down the sleeve 70 of the fluid control valve V fitted in the fitting hole 51 and receives the end surface 82a2 of the spool 80 and serves to stop the spool 80 at the rest position corresponding to the retard mode.

Figure 8:
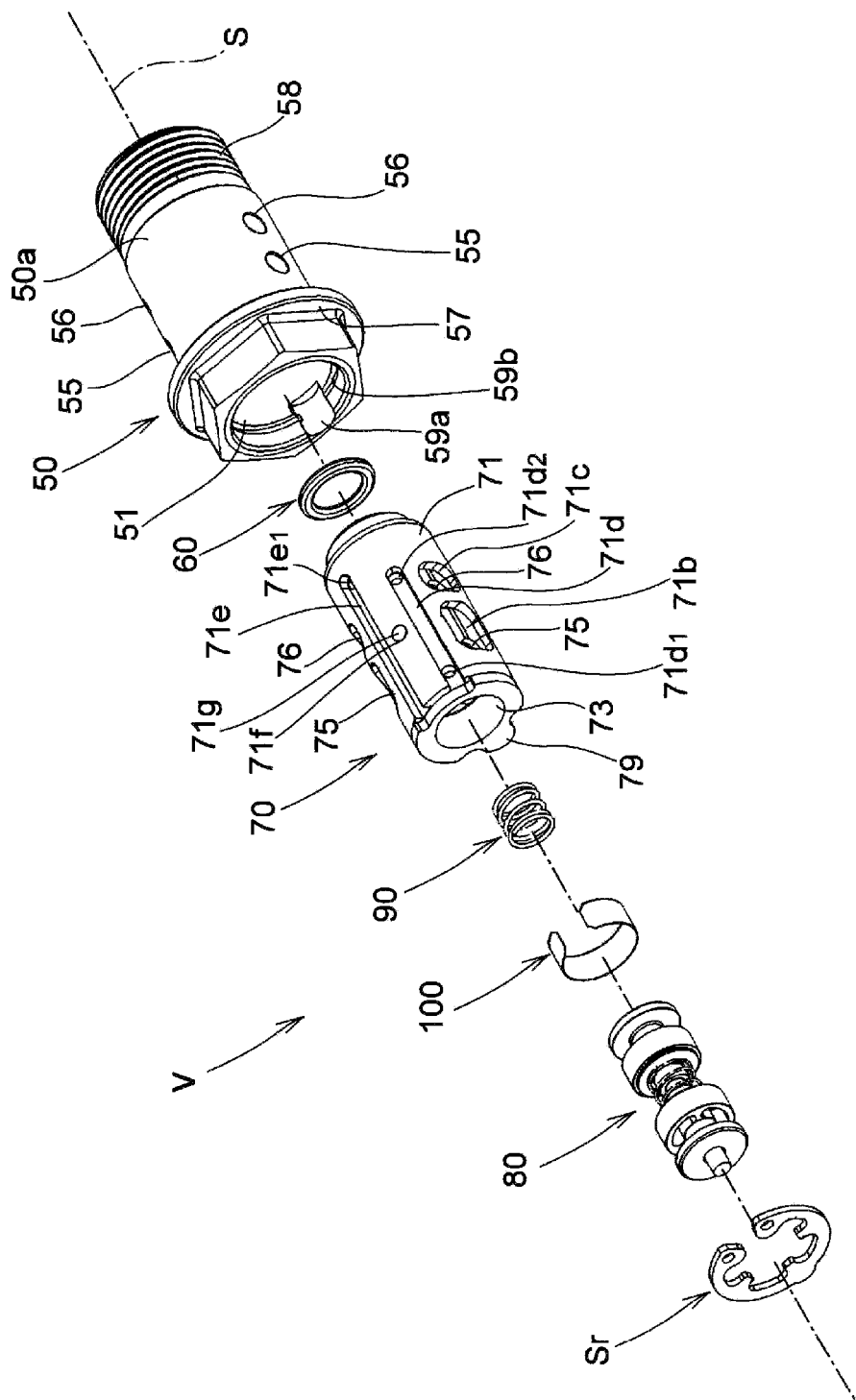
FIG. 8 is an exploded perspective view of the fastening bolt, the fluid control valve, and the like included in the valve timing changing device of the disclosure, as viewed obliquely from the front opposite to the camshaft side.
Figure 9:
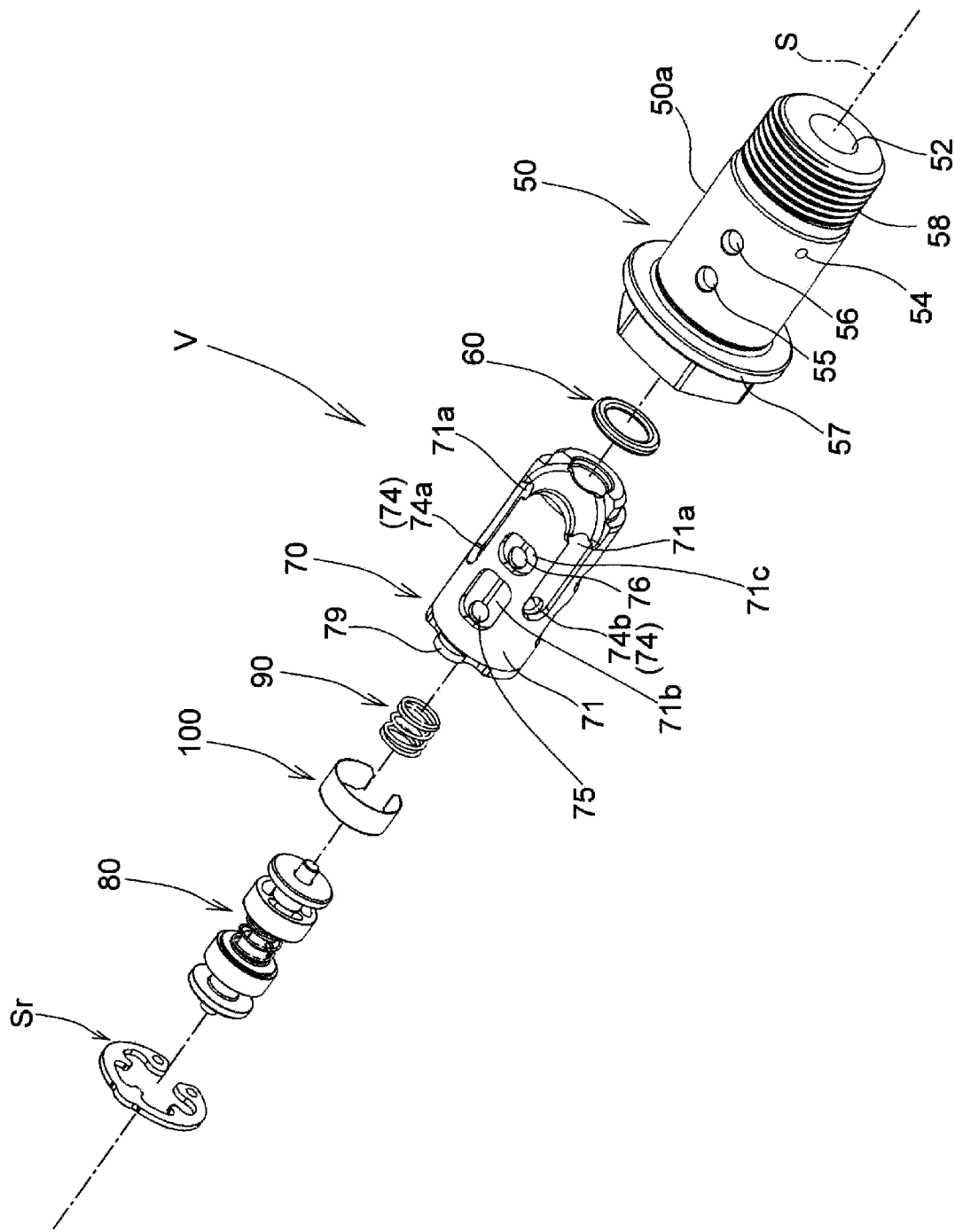
FIG. 9 is an exploded perspective view of the fastening bolt, the fluid control valve, and the like included in the valve timing changing device of the disclosure, as viewed obliquely from the back on the camshaft side.
Figure 10:
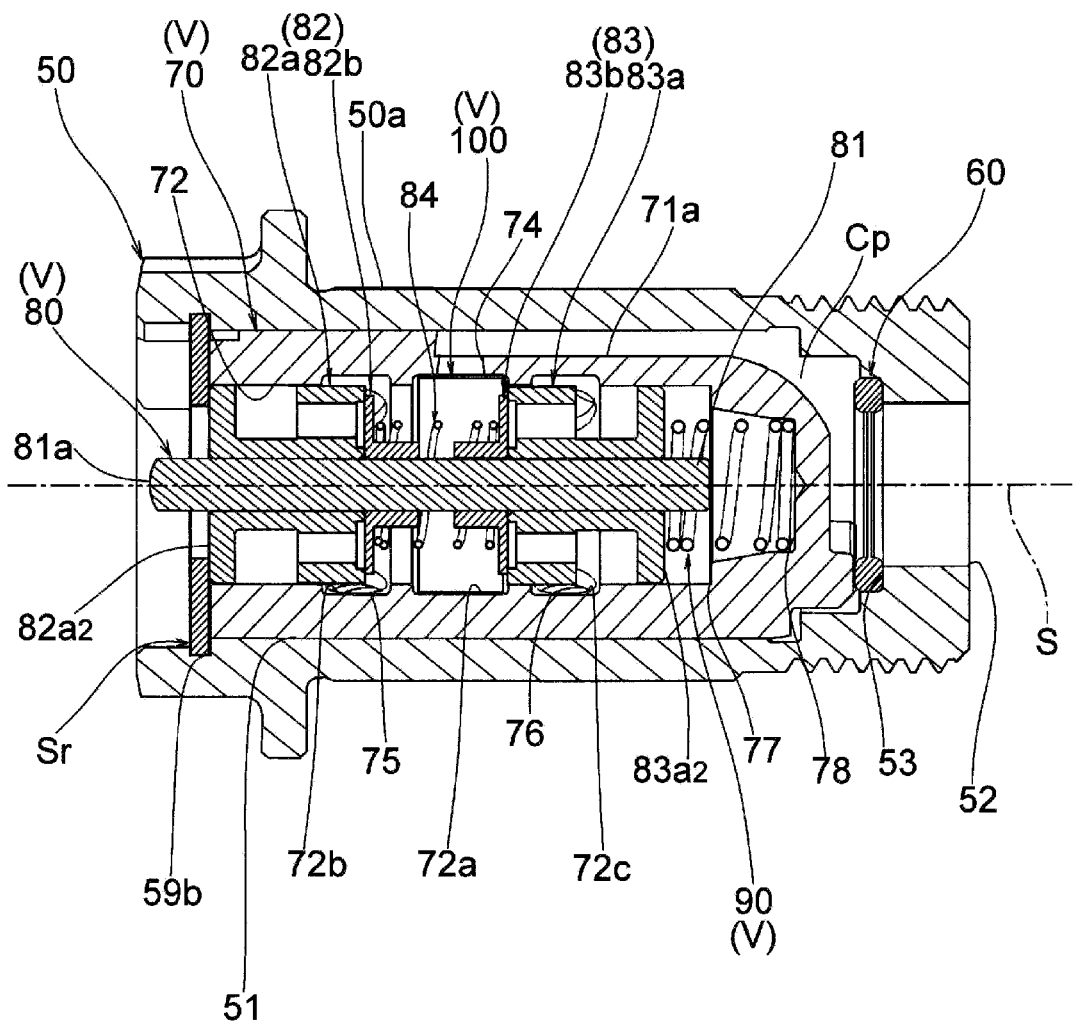
FIG. 10 shows a state in which the fluid control valve of the disclosure is disposed inside the fastening bolt, and is a cross-sectional view in the region of the inlet (supply port).

The fluid control valve V switches passages to supply or discharge hydraulic oil to the advance chamber AC and the retard chamber RC, and as shown in FIGS. 8 to 10, includes a sleeve 70, a spool 80, a biasing spring 90 and a C-shaped leaf spring 100.

Figure 11:
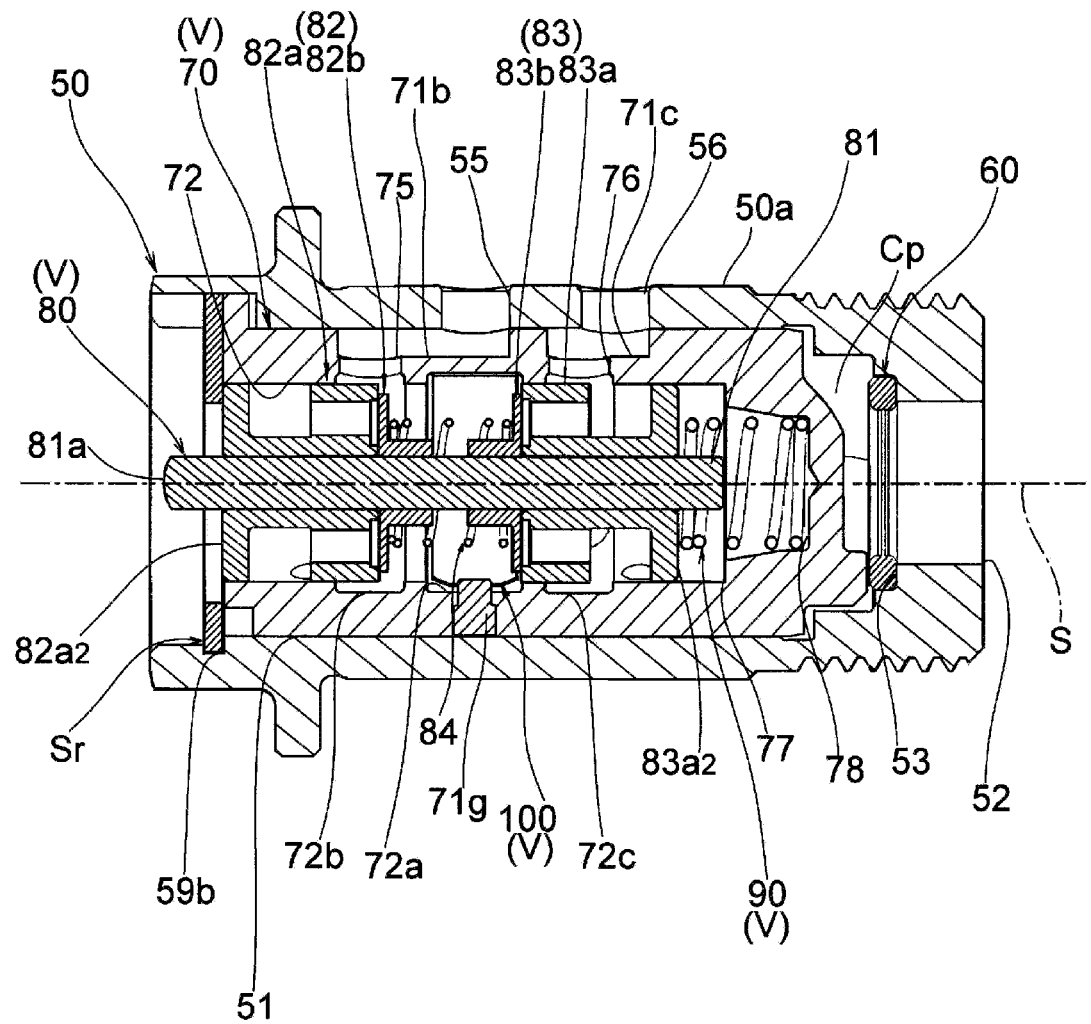
FIG. 11 shows a state in which the fluid control valve of the disclosure is disposed inside the fastening bolt, and is a cross-sectional view in the region of the first communication port (retard port) and the second communication port (advance port).
Figure 12:
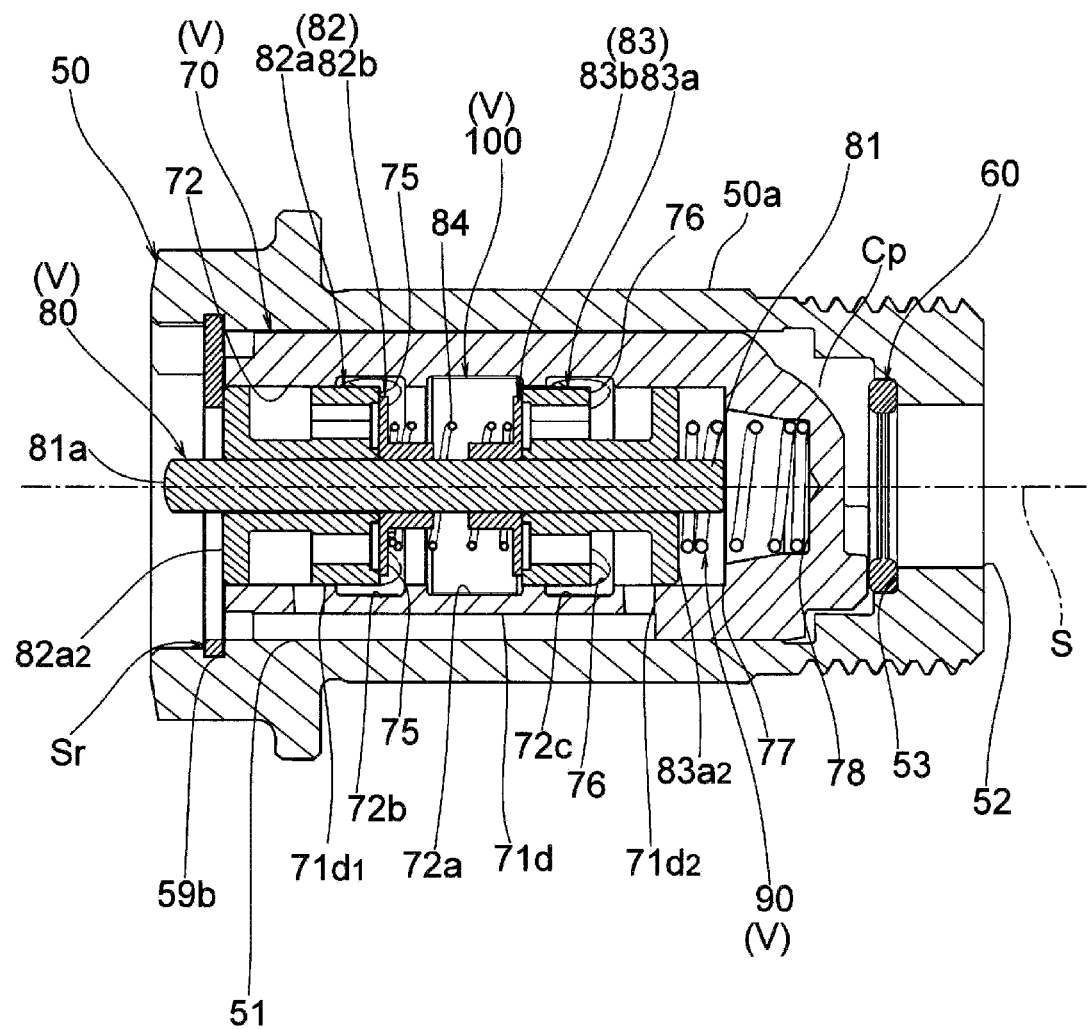
FIG. 12 shows a state in which the fluid control valve of the disclosure is disposed inside the fastening bolt, and is a cross-sectional view in the region of the first discharge passage that can communicate with the first communication port and the second discharge passage that can communicate with the second communication port.
Figure 13:
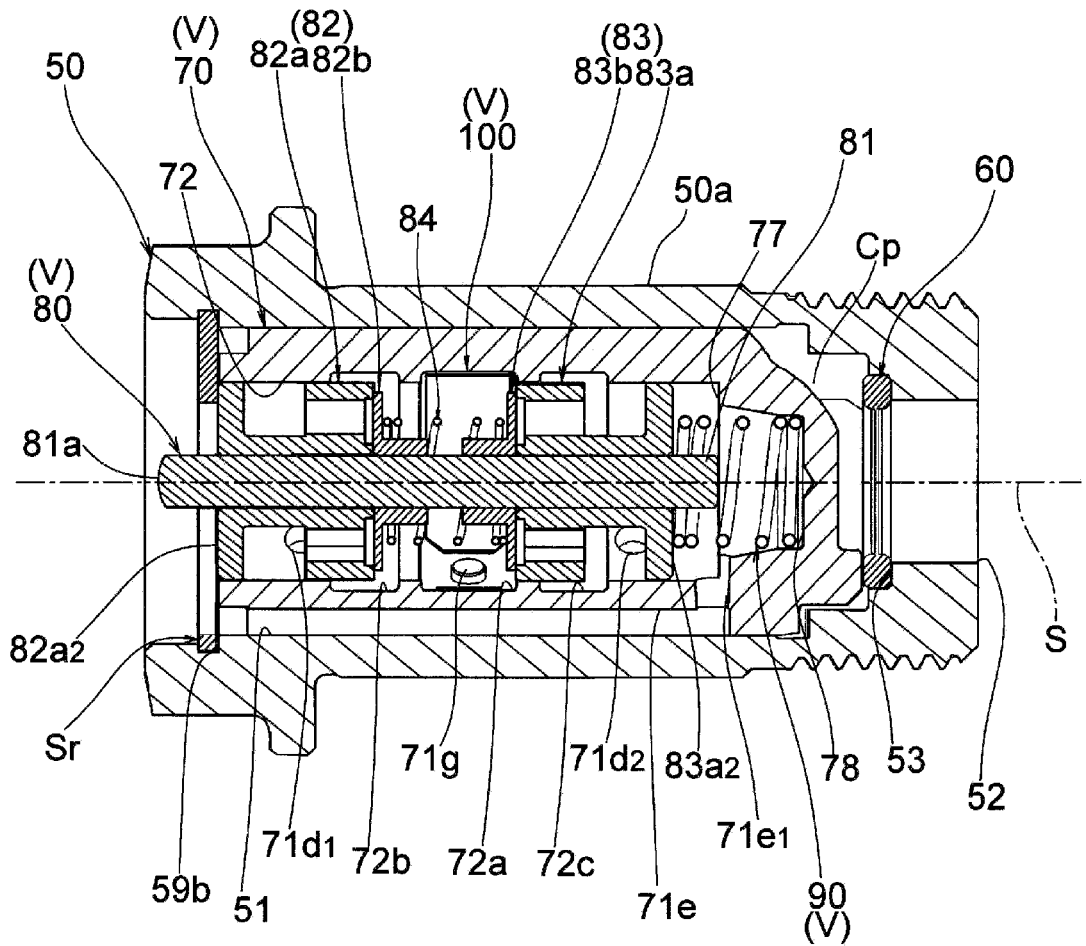
FIG. 13 shows a state in which the fluid control valve of the disclosure is disposed inside the fastening bolt, and is a cross-sectional view in the region of the third discharge passage that communicates with the region where the biasing spring biasing the spool is disposed.
Figure 14:
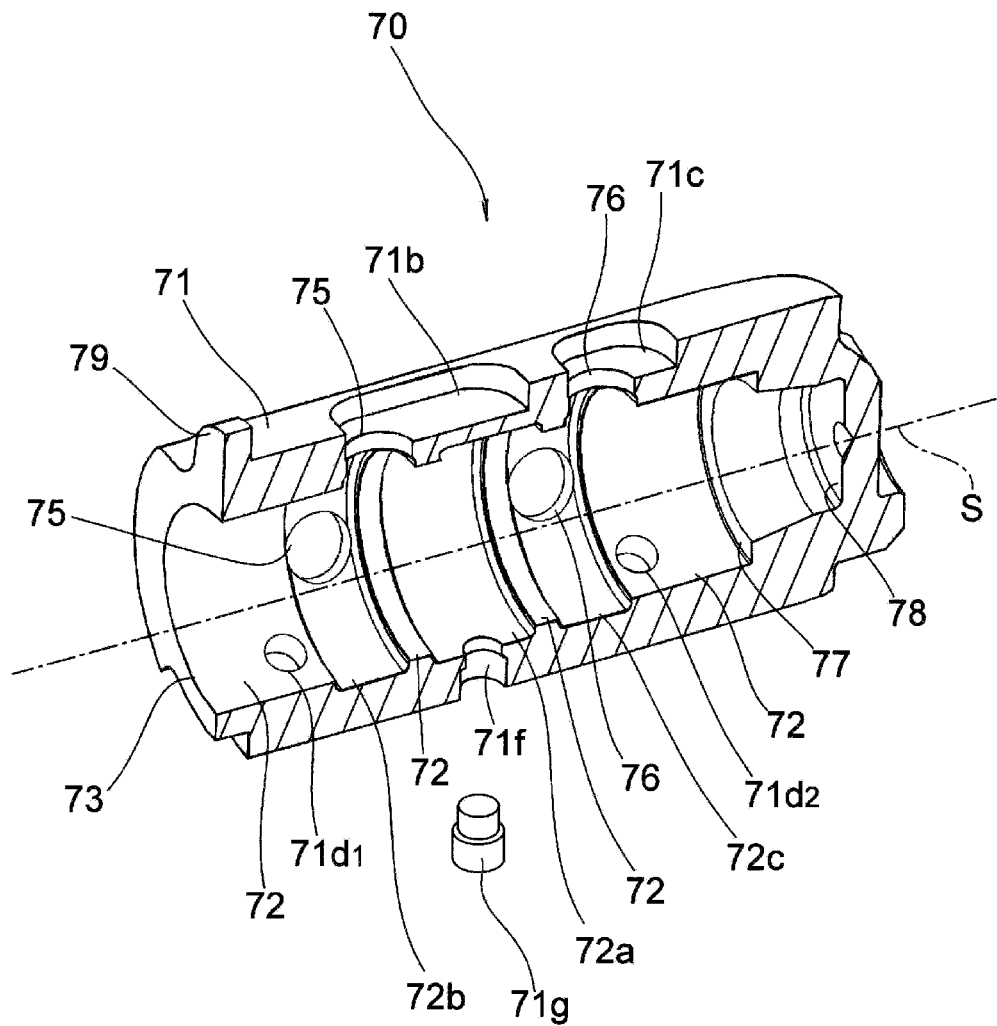
FIG. 14 is a perspective cross-sectional view showing the sleeve included in the fluid control valve of the disclosure.
Figure 15:
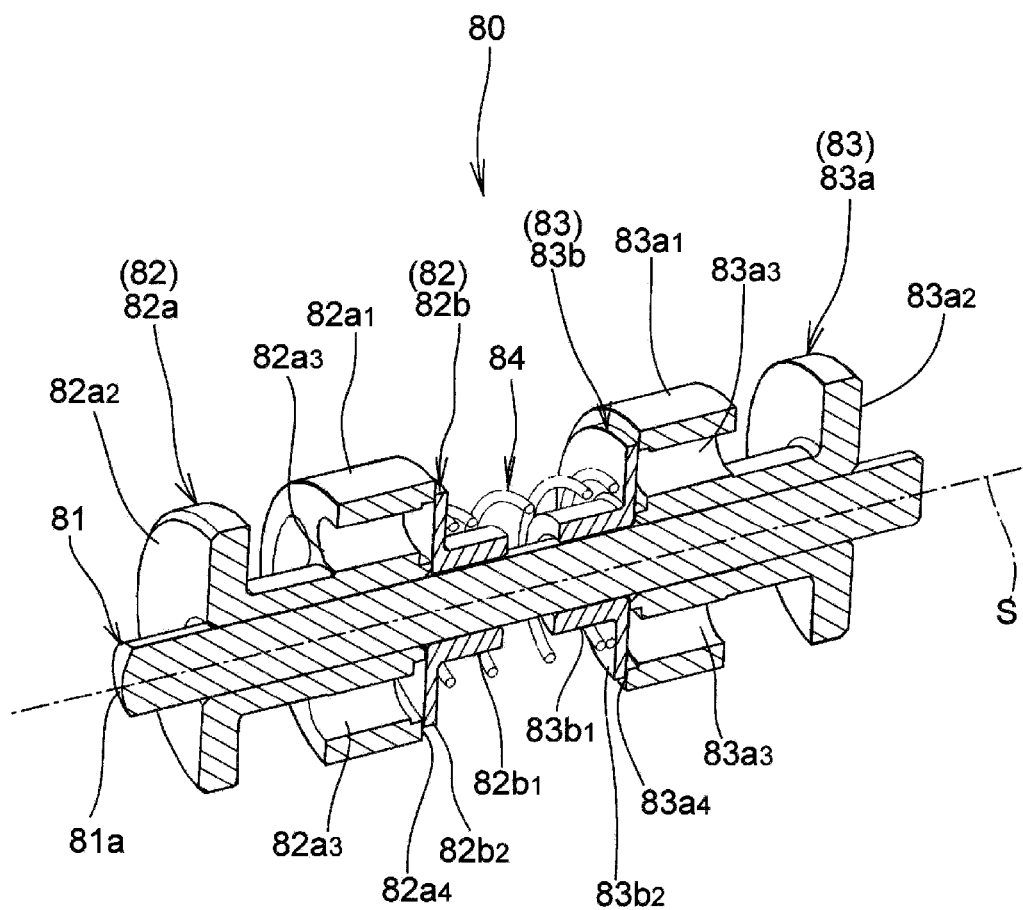
FIG. 15 is a perspective cross-sectional view showing the spool included in the fluid control valve of the disclosure.

As shown in FIGS. 8, 9 and 11, the sleeve 70 is formed in a bottomed cylindrical shape using aluminum or other metal material, and includes an outer wall 71, thinned parts 71a, 71b and 71c, groove passages 71d and 71e, through passages $71d_1$, $71d_2$ and $71e_1$, a fitting hole 71f, a fitting pin 71g as a restricting part, an inner peripheral surface 72, annular grooves 72a, 72b and 72c, an opening 73, a supply port 74, a retard port 75, an advance port 76, a stopper wall 77, a spring receiving part 78 and a positioning protrusion 79.

The outer wall 71 is formed as a cylindrical surface centered on the axis S and closely fitted into the fitting hole 51 of the fastening bolt 50.

The thinned part 71a is formed by hollowing out a part of the outer wall 71 in a region facing the supply port 74 (a first supply port 74a and a second supply port 74b) from the outside of the bottom wall and defines the crevice passage Cp together with the inner wall of the fastening bolt 50.

The thinned part 71b is formed by hollowing out a part of the outer wall 71 in a region facing the retard passage 55 of the fastening bolt 50 from the retard port 75, and functions as a passage between the retard port 75 and the retard passage 55.

The thinned part 71c is formed by hollowing out a part of the outer wall 71 in a region facing the advance passage 56 of the fastening bolt 50 from the advance port 76, and functions as a passage between the advance port 76 and the advance passage 56.

The groove passage 71d and the through passage 71d1 function as a first discharge passage that communicates with the retard port 75 as a first communication port to discharge hydraulic oil when a first valve portion 82 is closed.

The groove passage 71d and the through passage 71d2 function as a second discharge passage that communicates with the advance port 76 as a second communication port to discharge hydraulic oil when a second valve portion 83 is closed.

The groove passage 71e and the through passage $71e_1$ function as a third discharge passage that may discharge hydraulic oil accumulated in the region where the biasing spring 90 is disposed and that forms a breathing passage.

The fitting hole 71f is for fitting the fitting pin 71g as a restricting part, and is formed as a two-stage hole penetrating in the radial direction in the bottom wall of the annular groove 72a. The fitting pin 71g is formed as a stepped pin in which two cylinders having different outer diameters are formed as a single piece using iron or steel material. By closely fitting the fitting pin 71g into the fitting hole 71f, the amount of protrusion radially inward from the bottom surface of the annular groove 72a is restricted so as not to interfere with the spool 80 while ensuring sealing performance.

That is, the fitting pin 71g functions as a restricting part provided on the sleeve 70 to restrict the contraction of the diameter of the C-shaped leaf spring 100 beyond a predetermined inner diameter, and to restrict a notch 101 to be positioned away from the first supply port 74a and the second supply port 74b as inlets.

The inner peripheral surface 72 is formed in a cylindrical shape centered on the axis S, and brings the first valve portion 82 (first land 82a1) and the second valve portion 83 (second land 83a1) of the spool 80 into close contact and slidably guides them.

The annular groove 72a is formed as a cylindrical surface by hollowing out an annular shape to be recessed from the inner peripheral surface 72 with a width wider than the opening width of the supply port 74 in the direction of the axis S in the region facing the supply port 74 as an inlet, and functions as an inlet annular groove in which the C-shaped leaf spring 100 is disposed.

The annular groove 72b is formed by hollowing out an annular shape to be recessed from the inner peripheral surface 72 in a region facing the retard port 75 as the first communication port, and functions as a hydraulic oil passage.

The annular groove 72c is formed by hollowing out an annular shape to be recessed from the inner peripheral surface 72 in a region facing the advance port 76 as the second communication port, and functions as a hydraulic oil passage.

The width dimension of the annular groove 72a in the direction of the axis S is formed larger than the width dimension of the annular grooves 72b and 72c. Further, the width dimension of the C-shaped leaf spring 100 disposed in the annular groove 72a is formed larger than the width dimension of the annular grooves 72b and 72c.

According to this, when the C-shaped leaf spring 100 is pushed into the annular groove 72a along the inner peripheral surface 72 while contracting its diameter, the C-shaped leaf spring 100 may be prevented from erroneously entering the annular groove 72b.

The opening 73 allows a rod 81 of the spool 80 to protrude in the direction of the axis S. The supply port 74 functions as an inlet into which hydraulic oil as a fluid flows, communicates with the crevice passage Cp, and is disposed downstream of the through passage 54 in the crevice passage Cp.

Figure 16:
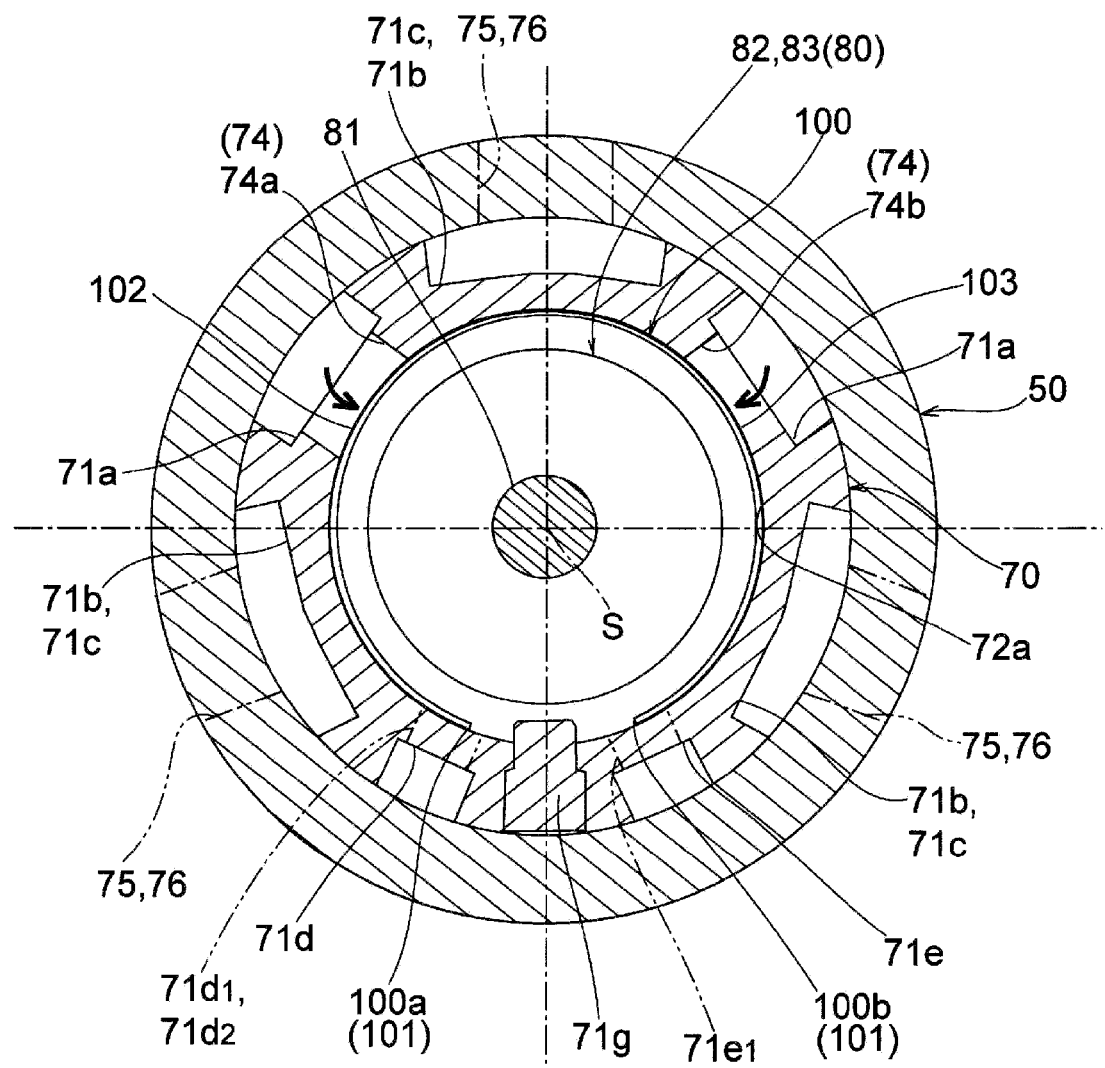
FIG. 16 is a cross-sectional view perpendicular to the axis showing the region of the C-shaped leaf spring in the fastening bolt and fluid control valve shown in FIG. 11.
Figure 18:
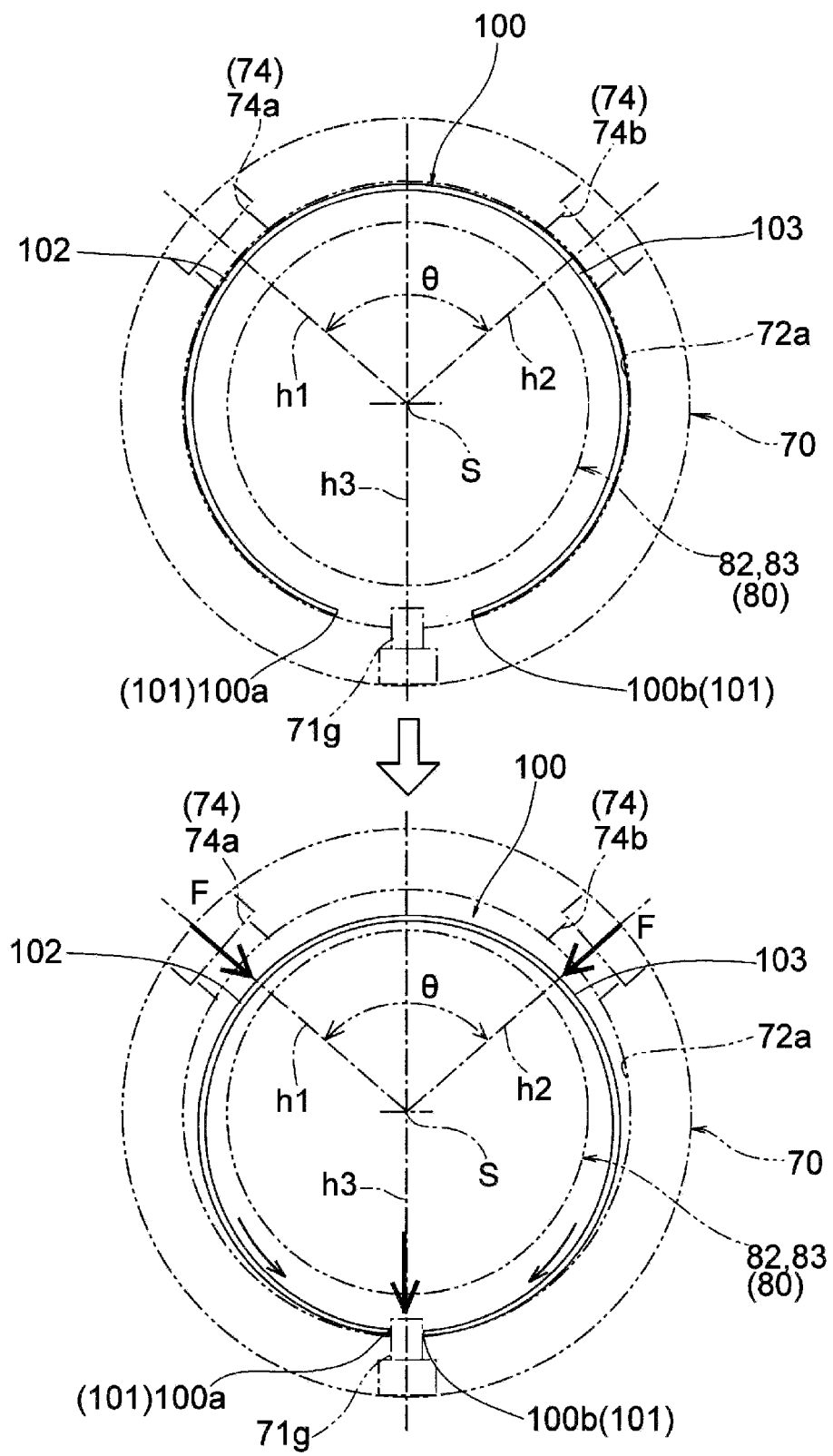
FIG. 18 is a schematic view for illustrating the operation of opening the valve by contracting the diameter of the C-shaped leaf spring from the state where the valve is closed by expanding the diameter.

Further, as shown in FIGS. 9, 16, and 18, the supply port 74 includes a first supply port 74a as a first inlet and a second supply port 74b as a second inlet, which are spaced apart from each other around the axis S.

Specifically, as shown in FIG. 18, the center line h1 of the first supply port 74a and the center line h2 of the second supply port 74b form an included angle θ smaller than 180 degrees (for example, an included angle θ of about 80 degrees to 110 degrees); preferably, the center lines h1 and h2 are formed to be symmetrical with respect to a normal line h3 passing through the center of the notch 101 of the C-shaped leaf spring 100 disposed in the annular groove 72a.

That is, the first supply port 74a and the second supply port 74b are formed to face a first region 102 and a second region 103 away from the notch 101 with respect to the C-shaped leaf spring 100 disposed in the annular groove 72a.

In other words, the C-shaped leaf spring 100 is disposed in the annular groove 72a so that the notch 101 is positioned away from the first supply port 74a and the second supply port 74b.

By adopting two supply ports (the first supply port 74a and the second supply port 74b) separated about the axis S in this manner, the hydraulic oil flowing from the supply port 74a acts on the first region 102 of the C-shaped leaf spring 100, and the hydraulic oil flowing from the supply port 74b acts on the second region 103 of the C-shaped leaf spring 100; therefore, the diameter of the C-shaped leaf spring 100 may be contracted while maintaining the annular shape without being bent inwardly into a convex shape.

The retard port 75 functions as a first communication port that communicates with the outside to allow the hydraulic oil as a fluid to pass through, communicates with the retard passage 55 of the fastening bolt 50 through the thinned part 71b, and also communicates with the retard chamber RC through the retard passage 28 of the vane rotor 20.

The advance port 76 functions as a second communication port that communicates with the outside to allow the hydraulic oil as a fluid to pass through, communicates with the advance passage 56 of the fastening bolt 50 through the thinned part 71c, and also communicates with the advance chamber AC through the advance passage 29 of the vane rotor 20.

Here, as shown in FIGS. 10 and 11, the retard port 75 and the advance port 76 are disposed on both sides of the supply port 74 in the direction of the axis S. That is, the communication ports communicating with the outside to allow the fluid to pass through include the first communication port (retard port 75) and the second communication port (advance port 75) located on both sides of the inlet (supply port 74) in the direction of the axis S.

The stopper wall 77 receives the end surface 83a2 of the second valve portion 83 of the spool 80 to stop the spool 80 at the deepest position corresponding to the advance mode.

The spring receiving part 78 receives the end of the biasing spring 90.

As shown in FIGS. 10 to 14, the spool 80 is disposed inside the sleeve 70 to be slidable on the inner peripheral surface 72, and includes a rod 81 extending in the direction of the axis S, a first valve portion 82 and a second valve portion 83 provided on the rod 81, and a compression spring 84 disposed between the first valve portion 82 and the second valve portion 83.

The rod 81 is formed to extend in the direction of the axis S and includes an end 81a exposed to the outside. The drive shaft 7a of the electromagnetic actuator 7 is engaged with the end 81a, and a driving force is exerted against the biasing force of the biasing spring 90.

The first valve portion 82 opens and closes the passage between the supply port 74 and the retard port 75, and includes a first fixed part 82a fixed to the rod 81 and a first movable part 82b movably supported along the rod 81 and biased by the compression spring 84.

The first fixed part 82a includes a first land $82a_1$ that slides in close contact with the inner peripheral surface 72, an end surface $82a_2$, a first internal passage $82a_3$ and an end surface $82a_4$.

The first land $82a_1$ is formed to be a cylindrical surface centered on the axis S with an outer diameter that is substantially equal to or slightly smaller than the inner diameter of the inner peripheral surface 72 and is formed to have a width that closes the retard port 75, and the first land $82a_1$ opens or closes the retard port 75.

The first movable part 82b functions as a check valve in cooperation with the compression spring 84, and includes a first fitting part $82b_1$ slidably fitted to the rod 81 and a first lid part $82b_2$ detachably contacting the end surface $82a_4$ to open and close the first internal passage $82a_3$.

The second valve portion 83 opens and closes the passage between the supply port 74 and the advance port 76, and includes a second fixed part 83a fixed to the rod 81 and a second movable part 83b movably supported along the rod 81 and biased by the compression spring 84.

The second fixed part 83a includes a second land $83a_1$ that slides in close contact with the inner peripheral surface 72, an end surface $83a_2$, a second internal passage $83a_3$ and an end surface $83a_4$.

The second land $83a_1$ is formed to be a cylindrical surface centered on the axis S with an outer diameter that is substantially equal to or slightly smaller than the inner diameter of the inner peripheral surface 72 and is formed to have a width that closes the advance port 76, and the second land $83a_1$ opens or closes the advance port 76.

The second movable part 83b functions as a check valve in cooperation with the compression spring 84, and includes a second fitting part $83b_1$ slidably fitted to the rod 81 and a second lid part $83b_2$ detachably contacting the end surface $83a_4$ to open and close the second internal passage $83a_3$.

The compression spring 84 is a compression type coil spring, is disposed between the first movable part 82b of the first valve portion 82 and the second movable part 83b of the second valve portion 83, and exerts a biasing force so that the first lid part $82b_2$ closes the first internal passage $82a_3$, and the second lid part $83b_2$ closes the second internal passage $83a_3$. Here, the relationship between the biasing force of the compression spring 84 and the passage resistance of the through passage $71d_1$ forming a part of the first discharge passage and the through passage $71d_2$ forming a part of the second discharge passage will be described.

When the first valve portion 82 is in the closed state and the pressure of the hydraulic oil flowing from the retard port 75 is large, the first lid part $82b_2$ opens, and the hydraulic oil discharged from the first discharge passage (through passage $71d_1$) is small, and the hydraulic oil actively flows into the advance port 76 side; when the pressure of the hydraulic oil flowing from the retard port 75 is small, the first lid part $82b_2$ is closed, and the hydraulic oil is actively discharged from the first discharge passage (through passage $71d_1$).

Further, when the second valve portion 83 is in the closed state and the pressure of the hydraulic oil flowing from the advance port 76 is large, the second lid part $83b_2$ opens, and the hydraulic oil discharged from the second discharge passage (through passage $71d_2$) is small, and the hydraulic oil actively flows into the retard port 75 side; when the pressure of the hydraulic oil flowing from the advance port 76 is small, the second lid part $83b_2$ is closed, and the hydraulic oil is actively discharged from the second discharge passage (through passage $71d_2$).

The biasing force of the compression spring 84 and the passage resistance of the through passages $71d_1$ and $71d_2$ are set to perform the above operation.

The biasing spring 90 is a compression type coil spring, and as shown in FIGS. 10 to 13, is assembled so that one end of the biasing spring 90 contacts the end surface $83a_2$ of the spool 80, and the other end of the biasing spring 90 contacts the spring receiving part 78 of the sleeve 70. When in the rest state, the biasing spring 90 exerts a biasing force to stop the spool 80 at a rest position where the end surface $82a_2$ of the spool 80 is brought into contact with the stopper member Sr, that is, a position corresponding to the retard mode.

Figure 17:
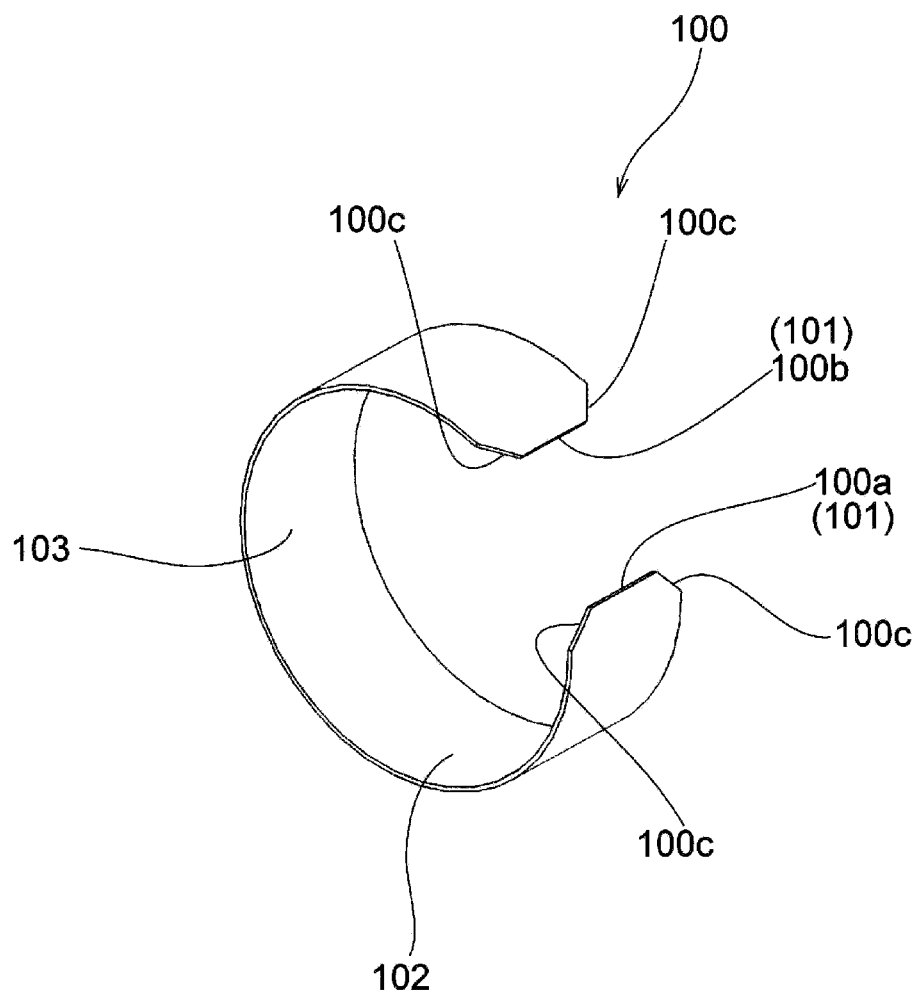
FIG. 17 is an external perspective view of the C-shaped leaf spring included in the fluid control valve of the disclosure.

As shown in FIG. 17, the C-shaped leaf spring 100 is formed by being bent in advance to bend a leaf spring made of spring steel with a width smaller than the width of the annular groove 72a in an annular shape with two ends (one end 100a and the other end 100b) facing each other to form a notch 101 with a predetermined gap and to have an outer diameter larger than the inner diameter of the annular groove 72a.

As shown in FIG. 16, the C-shaped leaf spring 100 is disposed in the annular groove 72a of the sleeve 70 to be able to be contracted in diameter so that the fitting pin 71g as a restricting part is positioned in the gap of the notch 101, and the C-shaped leaf spring 100 functions as a check valve that allows only the flow of the hydraulic oil supplied internally through the supply port 74 of the sleeve 70.

Here, as shown in FIG. 17, the C-shaped leaf spring 100 includes chamfers 100c on both corners of the one end 100a and both corners of the other end 100b, that is, the corners of both ends. The shape of the chamfer 100c is not limited to being linear, and may be curved in a convex shape.

By providing the chamfer in this manner, it is possible to prevent interference with or catching on the inner wall surface of the annular groove 72a during assembly or diameter expansion/contraction operation, thereby enabling smooth diameter expansion/contraction operation. Further, as shown in FIG. 18, the C-shaped leaf spring 100 is restricted from contracting beyond a predetermined inner diameter by the fitting pin 71g. Here, the "predetermined inner diameter" means an inner diameter at which the hydraulic oil flowing from the supply port 74 becomes a desired inlet amount and which may secure a gap that allows the spool 80 reciprocating inside the C-shaped leaf spring 100 to move smoothly without contact while the diameter of the C-shaped leaf spring 100 is contracted.

Furthermore, as shown in FIG. 16, the C-shaped leaf spring 100 is disposed in the annular groove 72a of the sleeve 70 with the notch 101 positioned in the region of the sleeve 70 away from the first supply port 74a and the second supply port 74b.

In this way, the C-shaped leaf spring 100 may reliably close the first supply port 74a and the second supply port 74b when it expands in diameter and contacts the bottom surface of the annular groove 72a.

As shown in FIG. 18, the C-shaped leaf spring 100 is disposed in the annular groove 72a of the sleeve 70 to be able to be contracted in diameter. Therefore, in this disposition state, unless the pressure on the outside against the inside of the sleeve 70 exceeds a predetermined level, the C-shaped leaf spring 100 expands in diameter within the annular groove 72a due to its elastic restoring force and closes the supply port 74 (the first supply port 74a and the second supply port 74b).

In this state, when the pressure of the hydraulic oil outside the first supply port 74a and the second supply port 74b exceeds a predetermined level than the pressure of the hydraulic oil inside the sleeve 70, the C-shaped leaf spring 100 begins to contract its diameter under the pressure F of the hydraulic oil on the outside.

In this diameter contraction operation, the pressure F of the hydraulic oil flowing from the first supply port 74a acts on the first region 102 of the C-shaped leaf spring 100, and the pressure F of the hydraulic oil flowing from the second supply port 74b acts on the second region 103 of the C-shaped leaf spring 100.

In this way, compared with the case where pressure is concentrated in one place, the C-shaped leaf spring 100 relatively moves in the circumferential direction so that the one end 100a and the other end 100b move toward the fitting pin 71g to slide more smoothly on the inner peripheral surface of the annular groove 72a, and contracts the diameter while maintaining the annular shape.

When the one end 100a and the other end 100b come into contact with each other to sandwich the fitting pin 71g, that is, when the inner diameter reaches a predetermined value, the diameter contraction operation of the C-shaped leaf spring 100 stops. At this time, the C-shaped leaf spring 100 is held in a state where it does not interfere with the spool 80. In this way, interference between the C-shaped leaf spring 100 and the spool 80 may be prevented, and desired functions may be achieved.

In addition, since the C-shaped leaf spring 100 does not generate an overlapped region in the process of expansion and contraction, it may always be in close contact with the bottom surface of the annular groove 72a, may ensure sufficient sealing performance when the supply port 74 (the first supply port 74a and the second supply port 74b) is closed, and may perform expansion and contraction operations smoothly.

In the C-shaped leaf spring 100, the opening characteristics are set so that hydraulic oil supplied flows through the passages 1b and 1c, the crevice passage Cp and the supply port 74 into the fluid control valve V, and flows from the retard port 75 into the retard chamber RC or from the advance port 76 into the advance chamber AC, and then the lock is released when the hydraulic pressure of the hydraulic oil filled in the through passage 54 and the groove passage 27 reaches a hydraulic pressure capable of releasing the lock mechanism 40.

Next, the operation of the valve timing changing device M will be described.

When the internal combustion engine is stopped, the vane rotor 20 is locked at an intermediate position with respect to the housing rotor 10 by the lock mechanism 40, as shown in FIG. 19.

In this way, the internal combustion engine may be started smoothly while preventing the flapping of the vane rotor 20 and the like. In addition, when the internal combustion engine is stopped, hydraulic oil is basically filled in the retard chamber RC by opening the first valve portion 82 at the rest position (a state in which communication between the groove passage 71d and the through passage 71d$_1$ and the retard port 75 is blocked) and by the backflow prevention function of the C-shaped leaf spring 100, except for the amount that leaks from the gaps.

Subsequently, when the internal combustion engine is started, the hydraulic oil supplied through the passages 1b and 1c and the crevice passage Cp opens the C-shaped leaf spring 100, flows into the fluid control valve V from the supply port 74, and is supplied to the retard chamber RC from the retard port 75 or the advance chamber AC from the advance port 76, and then when the hydraulic pressure of the hydraulic oil guided to the lock mechanism 40 through the through passage 54 and the groove passage 27 reaches a releasing hydraulic pressure, the lock pin 41 is released from the lock hole 11d to release the lock. After the internal combustion engine is started, the position of the spool 80 of the fluid control valve V is appropriately controlled via the drive shaft 7a of the electromagnetic actuator 7, and phase control is performed so that the vane rotor 20 and the camshaft 1 are retarded, advanced, or held at a predetermined angular position.

First, the operation when the internal combustion engine is operating at low speed, for example, will be described. In this low-speed operation state, the hydraulic oil in the retard chamber RC and the advance chamber AC may reciprocate following torque fluctuations (ΔT, -ΔT) exerted by the camshaft 1.

Figure 22:
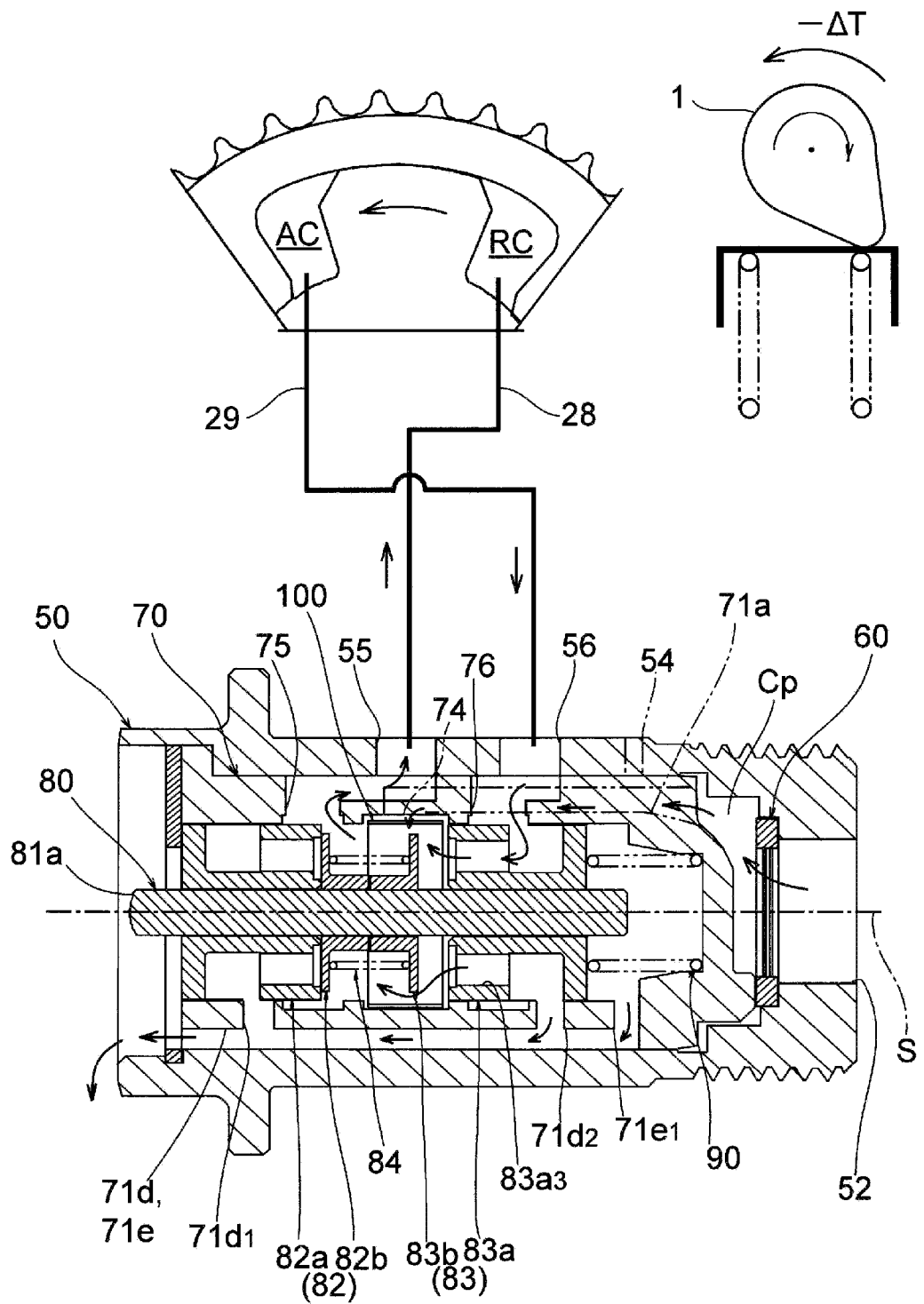
FIG. 22 is a schematic view showing the relationship between the spool of the fluid control valve and the flow of hydraulic oil in the retard port, the advance port, the retard chamber, and the advance chamber when the camshaft receives a reverse torque in the retard mode.
Figure 23:
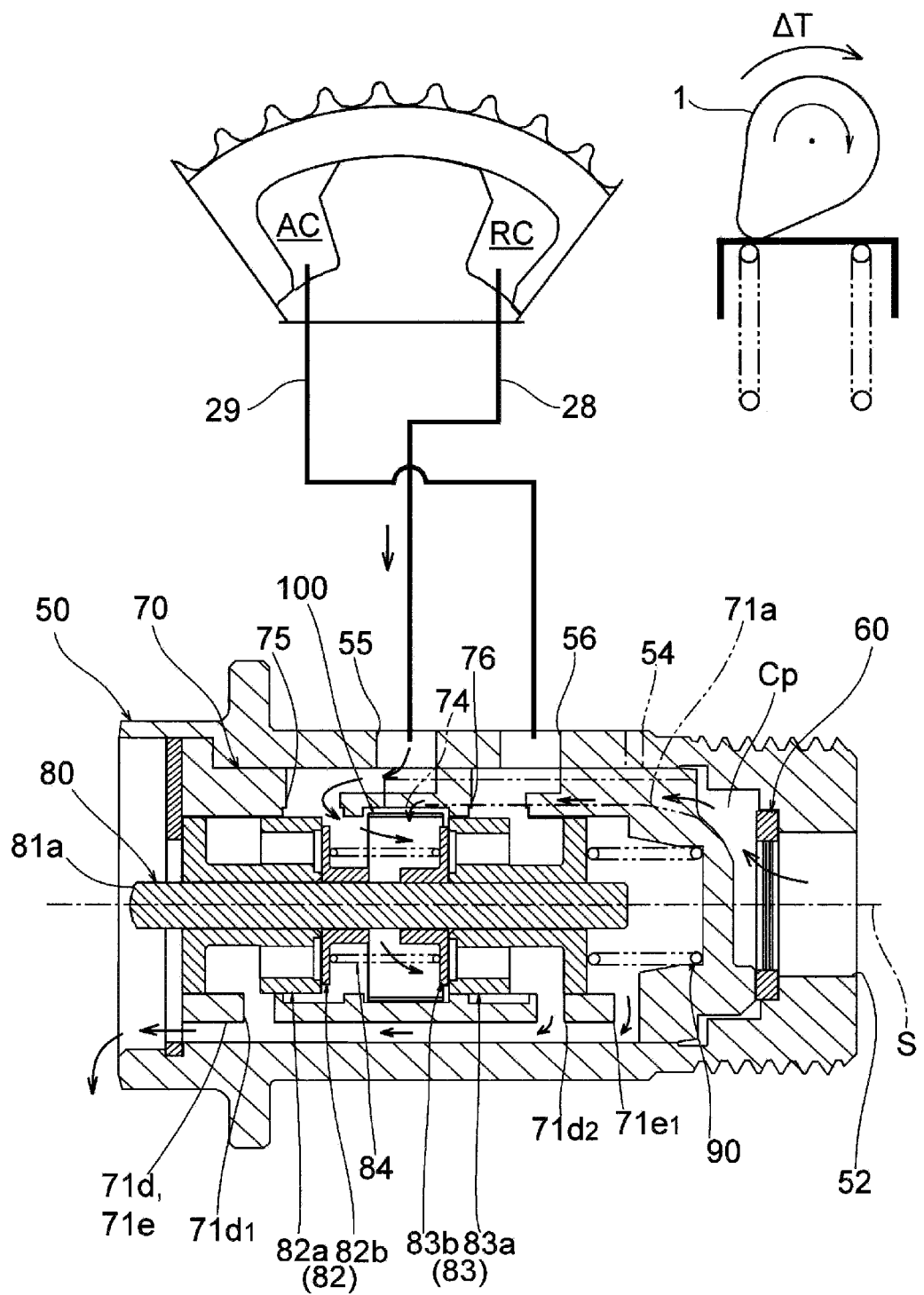
FIG. 23 is a schematic view showing the relationship between the spool of the fluid control valve and the flow of hydraulic oil in the retard port, the advance port, the retard chamber, and the advance chamber when the camshaft receives a forward torque in the retard mode.

For example, in the retard mode, the spool 80 is positioned at the rest position by the biasing force of the biasing spring 90, as shown in FIGS. 22 and 23.

In the retard mode, the first valve portion 82 is set to an open state in which the passage between the supply port 74 and the retard port 75 is opened, and the second valve portion 83 is in a closed state in which the passage between the supply port 74 and the advance port 76 is closed; specifically, a state is set in which the second land 83a$_1$ of the second fixed part 83a opens the advance port 76, and the second lid part 83b$_2$ of the second movable part 83b closes the second internal passage 83a$_3$. Further, the second discharge passage (the groove passage 71d and the through passage 71d$_2$) communicates with the advance port 76 and is in a state in which the hydraulic oil in the advance chamber AC may be discharged.

In this state, when the camshaft 1 receives a reverse torque (-ΔT) in a direction opposite to the forward rotation direction CR, the oil pressure of the hydraulic oil in the advance chamber AC increases. Therefore, as shown in FIG. 22, the hydraulic oil in the advance chamber AC resists the biasing force of the compression spring 84 and separates the second lid part 83b$_2$ of the second movable part 83b from the second fixed part 83a. In this way, the second internal passage 83a$_3$ is opened, and hydraulic oil actively flows from the advance port 76 to the retard port 75. At this time, a smaller amount of hydraulic oil than the hydraulic oil flowing to the retard port 75 is discharged through the through passage 71d$_2$ and the groove passage 71d.

In addition, when the camshaft 1 receives a forward torque (ΔT), the oil pressure of the hydraulic oil in the retard chamber RC increases. However, as shown in FIG. 23, since the hydraulic oil in the retard chamber RC acts in a direction to bring the second movable part 83b into contact with the second fixed part 83a, the second internal passage 83a$_3$ is closed, and hydraulic oil does not flow from the retard port 75 to the advance port 76.

By continuously receiving the reverse torque (-ΔT) and the forward torque (ΔT), the hydraulic oil in the advance chamber AC moves into the retard chamber RC, and the vane rotor 20 is positioned at the most retarded position shown in FIG. 20. During this process, the C-shaped leaf spring 100 is appropriately opened to allow the inflow of hydraulic oil from the supply port 74 in order to replenish the hydraulic oil.

Figure 24:
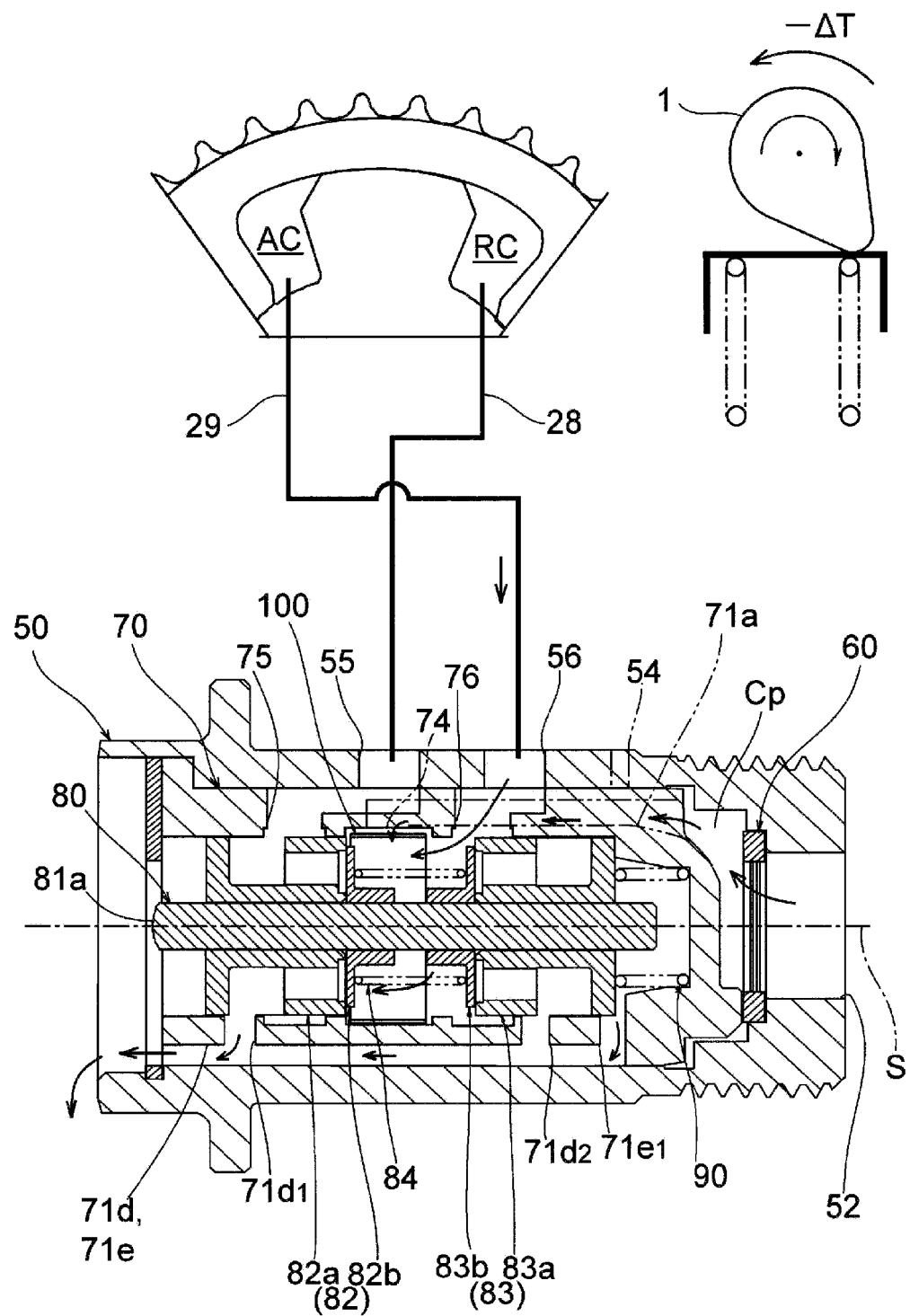
FIG. 24 is a schematic view showing the relationship between the spool of the fluid control valve and the flow of hydraulic oil in the retard port, the advance port, the retard chamber, and the advance chamber when the camshaft receives a reverse torque in the advance mode.
Figure 25:
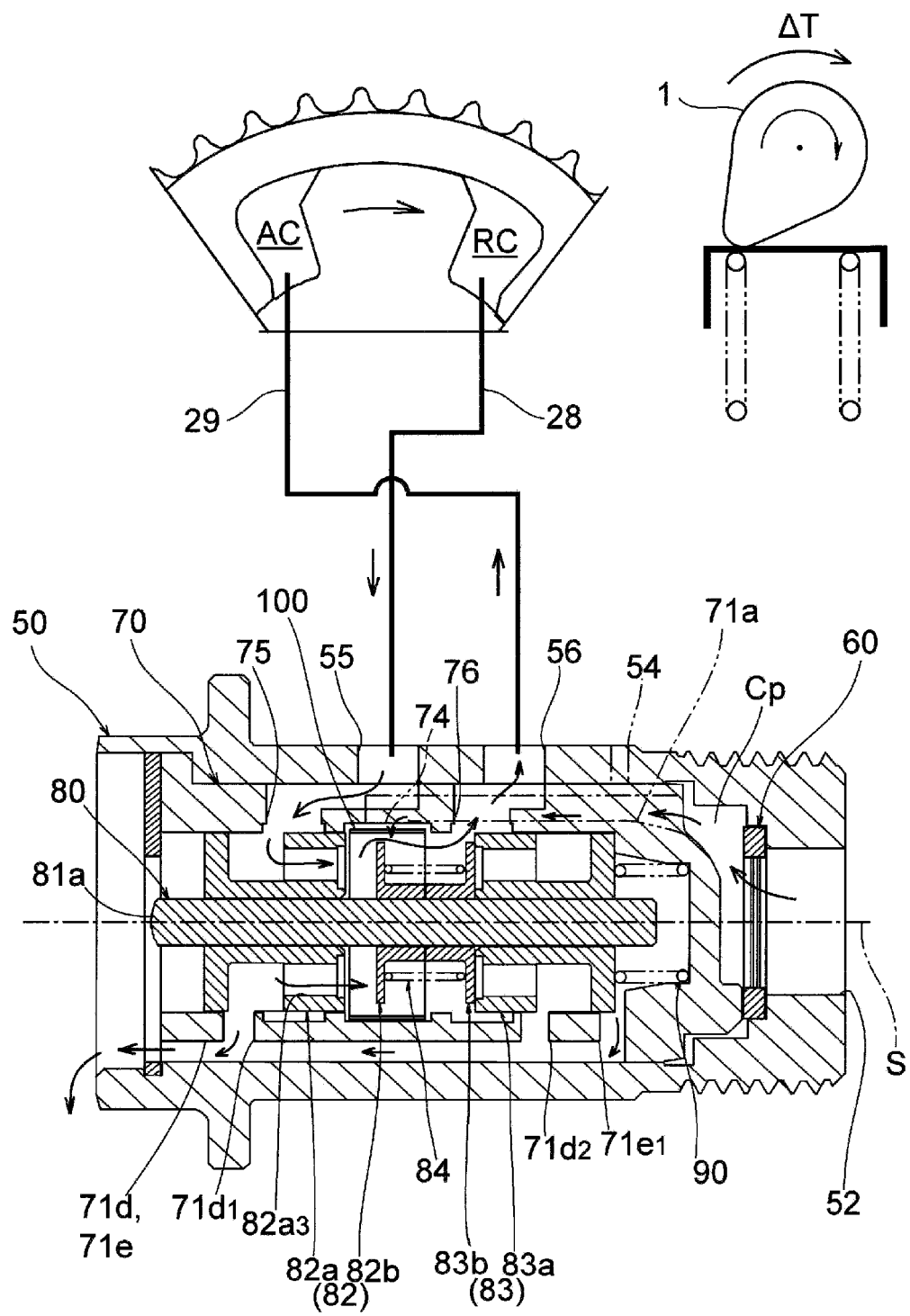
FIG. 25 is a schematic view showing the relationship between the spool of the fluid control valve and the flow of hydraulic oil in the retard port, the advance port, the retard chamber, and the advance chamber when the camshaft receives a forward torque in the advance mode.

Next, in the advance mode, as shown in FIGS. 24 and 25, the spool 80 is positioned at the deepest position in the direction of the axis S by the drive shaft 7a of the electromagnetic actuator 7 against the biasing force of the biasing spring 90.

In the advance mode, the second valve portion 83 is set to an open state in which the passage between the supply port 74 and the advance port 76 is opened, and the first valve portion 82 is in a closed state in which the passage between the supply port 74 and the retard port 75 is closed; specifically, a state is set in which the first land 82a$_1$ of the first fixed part 82a opens the retard port 75, and the first lid part 82b$_2$ of the first movable part 82b closes the first internal passage 82a$_3$. Further, the first discharge passage (the groove passage 71d and the through passage 71d$_1$) communicates with the retard port 75 and is in a state in which the hydraulic oil in the retard chamber RC may be discharged.

In this state, when the camshaft 1 receives a reverse torque (-ΔT) in a direction opposite to the forward rotation direction CR, the oil pressure of the hydraulic oil in the advance chamber AC increases. However, as shown in FIG. 24, since the hydraulic oil in the advance chamber AC acts in a direction to bring the first movable part 82b into contact with the first fixed part 82a, the first internal passage 82a$_3$ is closed, and hydraulic oil does not flow from the advance port 76 to the retard port 75.

In addition, when the camshaft 1 receives a forward torque (ΔT), the oil pressure of the hydraulic oil in the retard chamber RC increases. Therefore, as shown in FIG. 25, the hydraulic oil in the retard chamber RC resists the biasing force of the compression spring 84 and separates the first lid part $82b_2$ of the first movable part 82b from the first fixed part 82a. In this way, the first internal passage $82a_3$ is opened, and hydraulic oil actively flows from the retard port 75 to the advance port 76. At this time, a smaller amount of hydraulic oil than the hydraulic oil flowing to the advance port 76 is discharged through the through passage $71d_1$ and the groove passage 71d.

By continuously receiving the reverse torque (−ΔT) and the forward torque (ΔT), the hydraulic oil in the retard chamber RC moves into the advance chamber AC, and the vane rotor 20 is positioned at the most advanced position shown in FIG. 21. During this process, the C-shaped leaf spring 100 is appropriately opened to allow the inflow of hydraulic oil from the supply port 74 in order to replenish the hydraulic oil.

That is, in the state where the spool 80 of the fluid control valve V is positioned in the retard mode in which the first valve portion 82 is opened and the second valve portion 83 is closed, when the camshaft 1 receives a reverse torque (−ΔT), the second valve portion 83 opens to allow hydraulic oil to flow from the advance port 76 to the retard port 75; in the state where the spool 80 is positioned in the advance mode in which the first valve portion 82 is closed and the second valve portion 83 is opened, when the camshaft 1 receives a forward torque (ΔT), the first valve portion 82 opens to allow hydraulic oil to flow from the retard port 75 to the advance port 76.

The above series of operations are operations when the internal combustion engine is in a low-speed operation state, for example; when the internal combustion engine is operating at high speed, for example, the torque fluctuation (ΔT, −ΔT) exerted by the camshaft 1 is small, and reciprocating movement of hydraulic oil in the retard chamber RC and the advance chamber AC does not occur, and the opening and closing operations of the first valve portion 82 and the second valve portion 83 due to torque fluctuations are difficult to perform.

As a result, the valve opening of the C-shaped leaf spring 100 causes the hydraulic oil supplied from the supply port 74 to actively flow into the retard chamber RC or the advance chamber AC, and hydraulic oil in the advance chamber AC or the retard chamber RC is actively discharged outside from the second discharge passage (the through passage $71d_2$ and the groove passage 71d) or the first discharge passage (the through passage $71d_1$ and the groove passage 71d).

Figure 26:
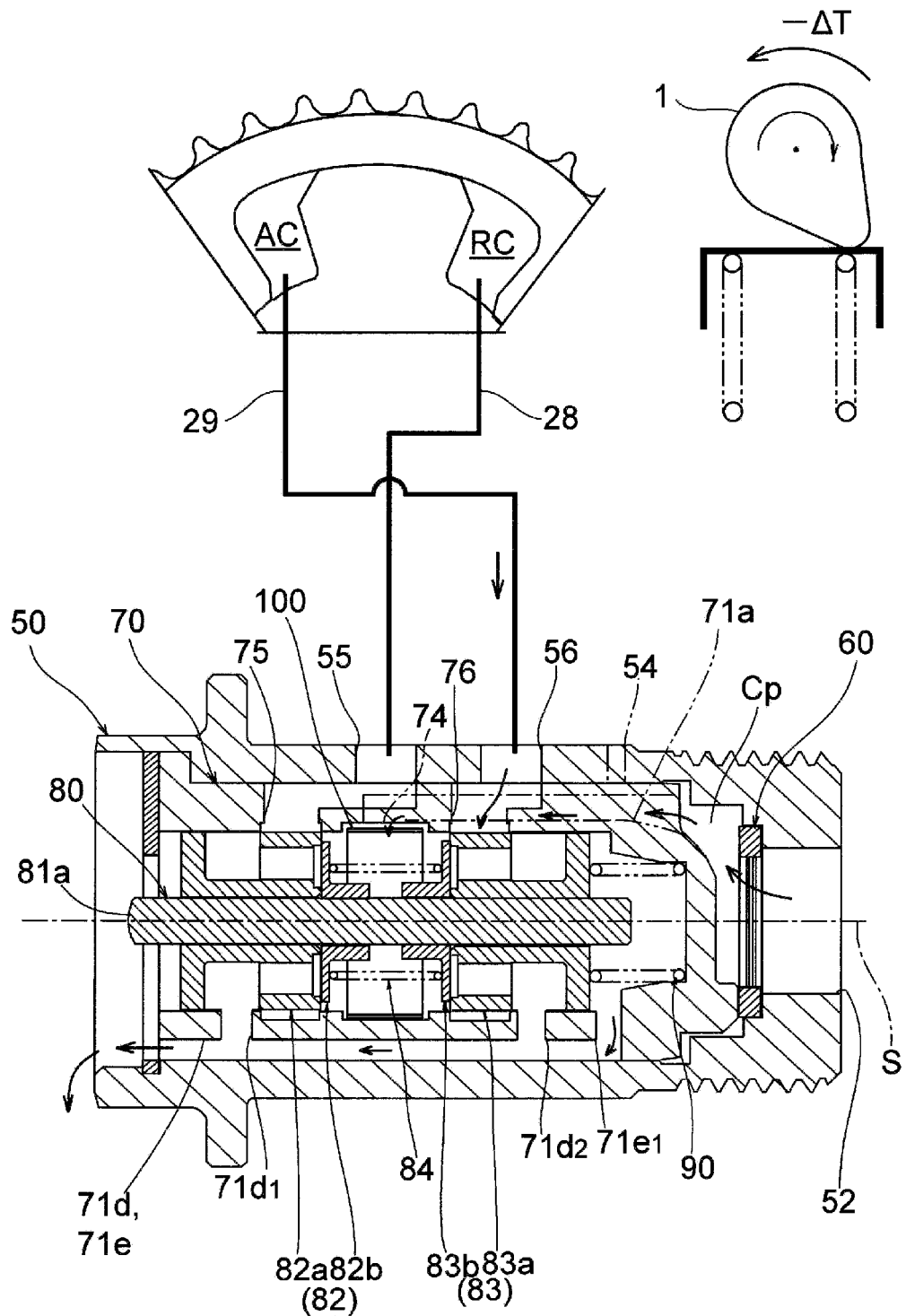
FIG. 26 is a schematic view showing the relationship between the spool of the fluid control valve and the flow of hydraulic oil in the retard port, the advance port, the retard chamber, and the advance chamber when the camshaft receives a reverse torque in the neutral holding mode.
Figure 27:
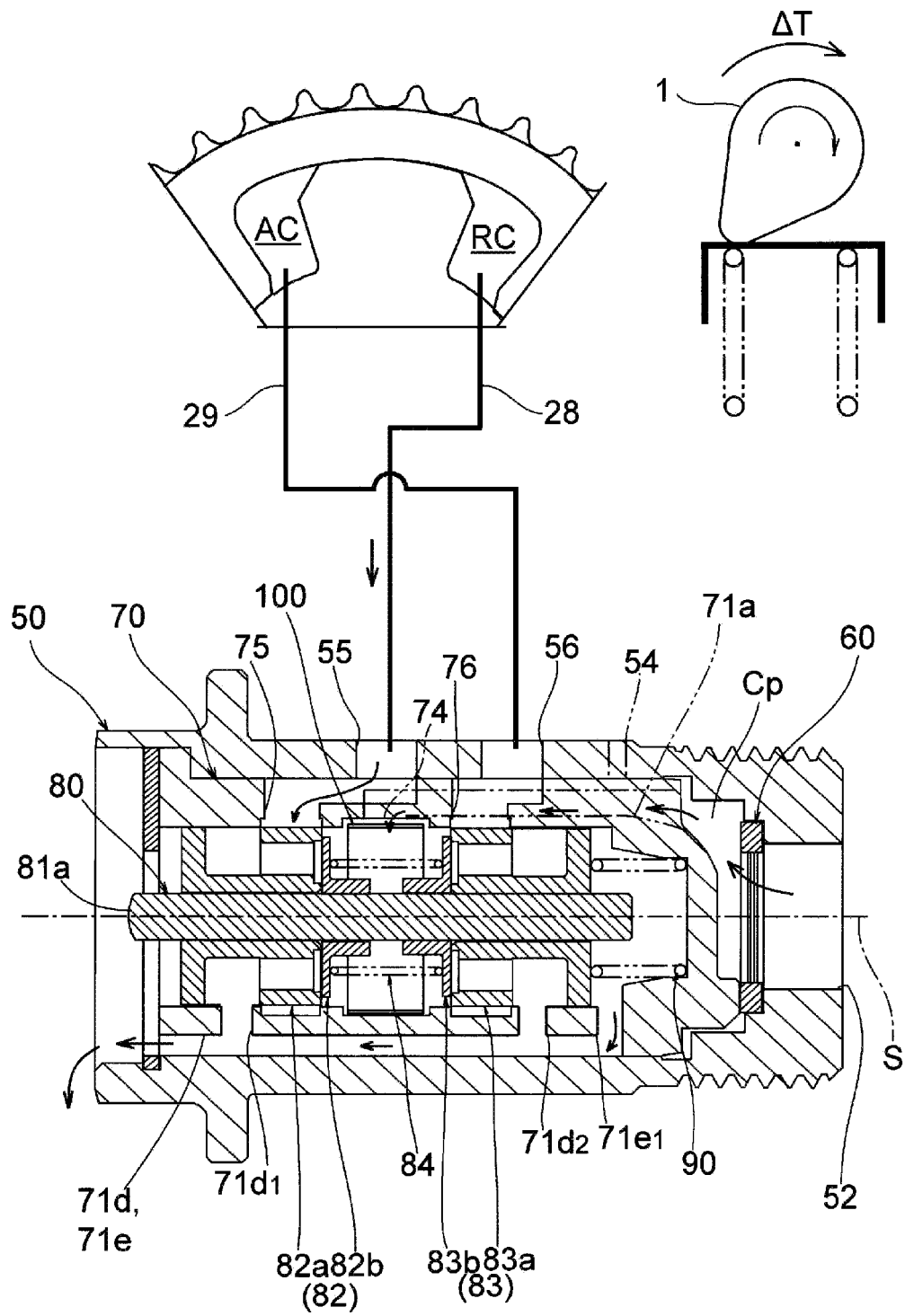
FIG. 27 is a schematic view showing the relationship between the spool of the fluid control valve and the flow of hydraulic oil in the retard port, the advance port, the retard chamber, and the advance chamber when the camshaft receives a forward torque in the neutral holding mode.

Next, in the neutral holding mode, as shown in FIGS. 26 and 27, the spool 80 is positioned at the intermediate position in the direction of the axis S by the drive shaft 7a of the electromagnetic actuator 7 against the biasing force of the biasing spring 90.

In the neutral holding mode, the first valve portion 82 is set to a closed state in which the passage between the supply port 74 and the retard port 75 is closed, and the second valve portion 83 is set to a closed state in which the passage between the supply port 74 and the advance port 76 is closed.

Specifically, the first valve portion 82 is set to a state in which the first land $82a_1$ of the first fixed part 82a closes the retard port 75, and the first lid part $81b_2$ of the first movable part 82b closes the first internal passage $82a_3$. Further, the second valve portion 83 is set to a state in which the second land $83a_1$ of the second fixed part 83a closes the advance port 76, and the second lid part $83b_2$ of the second movable part 83b closes the second internal passage $83a_3$. Further, communication between the first discharge passage (the groove passage 71d and the through passage $71d_1$) and the retard port 75 is blocked, and communication between the second discharge passage (the groove passage 71d and the through passage $71d_2$) and the advance port 76 is blocked.

In this state, when the camshaft 1 receives a reverse torque (−ΔT) in a direction opposite to the forward rotation direction CR, the oil pressure of the hydraulic oil in the advance chamber AC increases. However, since the advance port 76 is closed by the second land $83a_1$ of the second valve portion 83 as shown in FIG. 26, the hydraulic oil in the advance chamber AC cannot move from the advance port 76 to the retard port 75 and stays in the advance chamber AC.

In addition, when the camshaft 1 receives a forward torque (ΔT), the oil pressure of the hydraulic oil in the retard chamber RC increases. However, since the retard port 75 is closed by the first land $82a_1$ of the first valve portion 82 as shown in FIG. 27, the hydraulic oil in the retard chamber RC cannot move from the retard port 75 to the advance port 76 and stays in the retard chamber RC.

As described above, in the neutral holding mode, the reciprocation of hydraulic oil between the retard chamber RC and the advance chamber AC is blocked, and the first discharge passage and the second discharge passage are also closed; therefore, the vane rotor 20 is held at a desired intermediate position with respect to the housing rotor 10 between the most retarded position and the most advanced position.

That is, in the fluid control valve V, the spool 80 is formed to block the reciprocation of hydraulic oil between the retard chamber RC and the advance chamber AC in the state of being positioned in the neutral holding mode in which the first valve portion 82 closes the retard port 75 and the second valve portion 83 closes the advance port 76.

As described above, the fluid control valve V is a torque-driven and hydraulically-driven fluid control valve capable of reciprocating hydraulic oil between the retard chamber RC and the advance chamber AC by the fluctuating torque received by the camshaft 1 and capable of discharging a part of the supplied hydraulic oil; therefore, the hydraulic oil may be caused to reciprocate between the retard chamber RC and the advance chamber AC in an operating state where a sufficient fluctuating torque is obtained (for example, during low-speed operation), and the hydraulic oil may be discharged actively to change the opening/closing timing of the valve to the desired timing in an operating state where it is difficult to obtain a sufficient fluctuating torque (for example, during high-speed operation).

Further, since the fluid control valve V is disposed inside the fastening bolt 50, it contributes to the integration of parts and the miniaturization of the device.

In particular, the C-shaped leaf spring 100 is formed by bending a leaf spring into an annular shape, making both ends (one end 100a and the other end 100b) face each other, and forming a notch 101 with a predetermined gap so that the diameter may be contracted. In this way, there is no region where the leaf spring overlaps, which may ensure sealing performance and smooth operation, and contribute to simplification of the structure and miniaturization of the device.

As described above, according to the fluid control valve V according to the above embodiment, interference between the C-shaped leaf spring 100 and the spool 80 may be prevented, and the sealing performance and smooth operation of the C-shaped leaf spring 100 may be ensured, and desired functions may be achieved. Further, according to the valve timing changing device M including the fluid control valve V, it is possible to achieve a desired operation without causing a malfunction of the fluid control valve V while achieving miniaturization of the device and the like.

Figure 28:
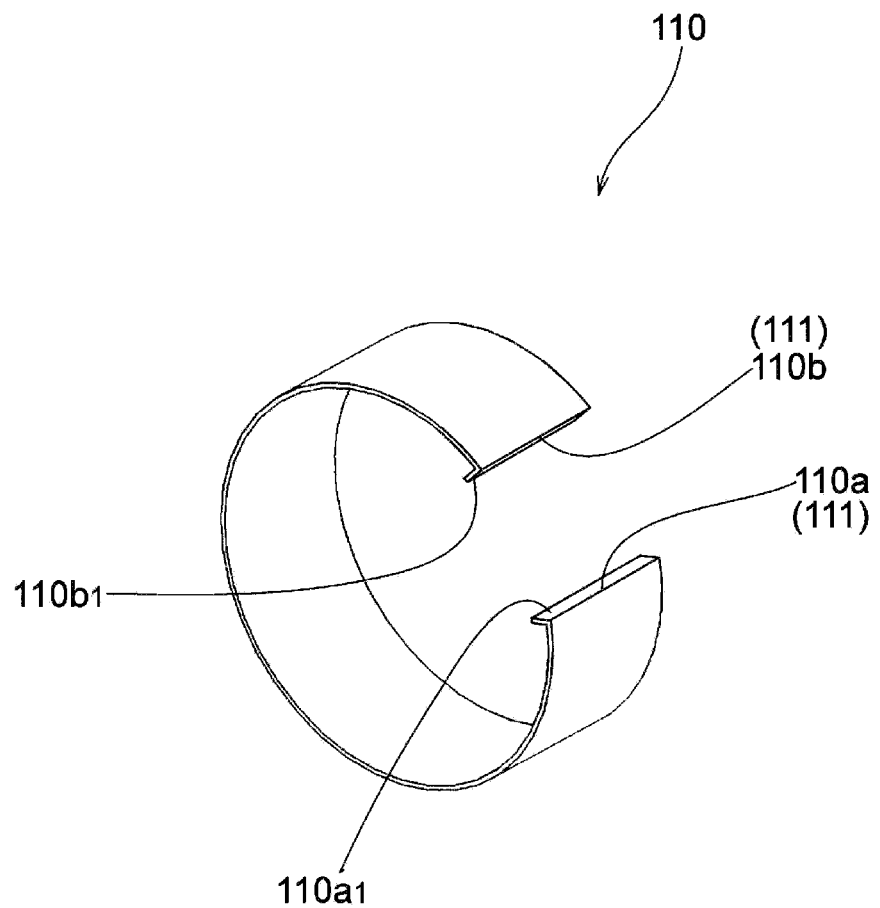
FIG. 28 is an external perspective view showing a C-shaped leaf spring according to another embodiment.

FIG. 28 shows a C-shaped leaf spring 110 according to a second embodiment.

The C-shaped leaf spring 110 according to the second embodiment is formed by being bent in advance to bend a leaf spring similar to the one described above into an annular shape with two ends (one end 110a and the other end 110b) facing each other to form a notch 111 with a predetermined gap and to have an outer diameter larger than the inner diameter of the annular groove 72a.

Further, the C-shaped leaf spring 110 includes a bent piece $110a_1$ bent radially inward at the one end 110a and a bent piece $110b_1$ bent radially inward at the other end 110b.

As described above, since the bent pieces $110a_1$ and $110b_1$ are provided at both ends, when the C-shaped leaf spring 110 is fitted into the annular groove 72a of the sleeve 70 with the diameter contracted, assembly may be easily performed by gripping the two bent pieces $110a_1$ and $110b_1$ with a tool. Other than that, the same effects as those of the C-shaped leaf spring 100 according to the above-described embodiment may be obtained.

In the above embodiment, two inlets, that is, the first inlet (supply port 74a) and the second inlet (supply port 74b) are shown as the inlets into which the fluid flows, but the disclosure is not limited thereto. Instead, a configuration may be adopted in which one inlet (supply port) is adopted, and the notches 101 and 111 of the C-shaped leaf springs 100 and 110 are disposed in the annular groove of the sleeve so as to be located in a region separated from the one inlet (supply port).

In the above embodiments, the fitting pin 71g is shown as a restricting part provided on the sleeve 70 to restrict the diameter contraction of the C-shaped leaf springs 100 and 110 beyond a predetermined inner diameter and to restrict the notches 101 and 111 to be positioned away from the inlet (supply port 74), but the disclosure is not limited thereto. For example, instead of the fitting pin 71g, a screw to be screwed into a screw hole of the sleeve may be adopted as the restricting part, or a protrusion formed as one piece on the sleeve to protrude from the bottom surface of the annular groove 72a may be adopted as the restricting part.

Further, in the above embodiments, the C-shaped leaf springs 100 and 110 that are being bent in advance are shown as the C-shaped leaf springs, but the disclosure is not limited thereto, and a linearly extending leaf spring may be bent and inserted into the inner peripheral surface 72 of the sleeve 70 to be fitted into the annular groove 72a.

In the above embodiments, the lock mechanism 40 locks in the intermediate position, but the disclosure is not limited thereto, and the lock mechanism 40 may be in the most retarded position or any position.

In the above embodiments, the rotation biasing spring 30 exerting a biasing force in the advancing direction is shown as the rotation biasing spring for rotationally biasing the vane rotor 20, but the disclosure is not limited thereto, and a rotation biasing spring that exerts a biasing force in the retarding direction may be adopted instead.

In the above embodiments, the fluid control valve V that is torque-driven and hydraulically-driven is shown as the fluid control valve, but the disclosure is not limited thereto. Other forms of fluid control valves may be adopted as long as they include a C-shaped leaf spring according to the disclosure to supply and discharge hydraulic oil.

In the above embodiments, the fluid control valve V is disposed inside the fastening bolt 50, but the disclosure is not limited thereto, and the disclosure may also be applied to a configuration in which the fluid control valve is disposed in the cylinder block of the engine.

In the above embodiments, hydraulic oil is shown as the fluid controlled by the fluid control valve, but the disclosure is not limited thereto. The fluid control valve may be applied in controlling the flow of other fluids for any fluid capable of actuating a C-shaped leaf spring located within the sleeve to open and close the inlet.

As described above, the fluid control valve of the disclosure may prevent interference between the C-shaped leaf spring and the spool, ensure the sealing performance and smooth operation of the C-shaped leaf spring, and achieve desired functions. Therefore, it may be applied not only to internal combustion engines mounted on automobiles and the like, but also to internal combustion engines mounted on motorcycles and the like, and other machines or devices for controlling the flow of fluid.

What is claimed is:

1. A valve timing changing device for changing opening and closing timing of an intake valve or an exhaust valve driven by a camshaft, the valve timing changing device comprising:
    a housing rotor that rotates coaxially with the camshaft;
    a vane rotor that defines an advance chamber and a retard chamber together with the housing rotor and that rotates integrally with the camshaft; and
    a fluid control valve that controls supply and discharge of hydraulic oil with respect to the advance chamber and the retard chamber,
    wherein the fluid control valve comprises:
        a sleeve in a bottomed cylindrical shape, comprising an inlet into which the hydraulic oil flows, a communication port that communicates with outside to allow the hydraulic oil to pass, a cylindrical inner peripheral surface centered on an axis, and an inflow annular groove that is recessed from the inner peripheral surface in a region facing the inlet;
        a spool slidably disposed on the inner peripheral surface in the sleeve to open and close the communication port;
        a C-shaped leaf spring which is formed by bending a leaf spring into an annular shape with two ends facing each other to form a notch with a predetermined gap and which is disposed in the inflow annular groove to be able to be contracted in diameter to open and close the inlet; and
        a fitting pin provided on the sleeve for restricting diameter contraction of the C-shaped leaf spring beyond a predetermined inner diameter and for restricting a position of the notch in a region away from the inlet, wherein the fitting pin is fitted to a fitting hole of the sleeve,
    wherein the inlet is a supply port to which the hydraulic oil is supplied,
    wherein the communication port comprises a first communication port and a second communication port,
    the first communication port is a retard port that communicates with the retard chamber, and
    the second communication port is an advance port that communicates with the advance chamber,
    wherein the C-shaped leaf spring is disposed such that the fitting pin is positioned in the gap of the notch, and is bent in advance to have an outer diameter larger than an inner diameter of the inflow annular groove formed in the sleeve, in response to an action of the hydraulic oil on the C-shaped leaf spring, the C-shaped leaf spring relatively moves in a circumferential direction so that one end and the other end move toward the fitting pin, and contracts the outer diameter while maintaining the annular shape, the diameter contraction of the C-shaped leaf spring stops in response to the one end and the other end coming into contact with each other to sandwich the fitting pin, and the C-shaped leaf spring is restricted from contracting beyond the predetermined inner diameter by the fitting pin, the predetermined inner diameter is an inner diameter at which the hydraulic oil flowing from the supply port becomes a desired inlet amount and which secures a gap that allows the spool reciprocating inside the C-shaped leaf spring to move smoothly without contact so that the C-shaped leaf spring does not interfere with the spool while the outer diameter of the C-shaped leaf spring is contracted.

2. The valve timing changing device according to claim 1, wherein the C-shaped leaf spring comprises chamfered corners at the two ends.

3. The valve timing changing device according to claim 1, wherein the C-shaped leaf spring comprises bent pieces bent radially inward at the two ends.

4. The valve timing changing device according to claim 1, wherein the fitting pin protrudes radially inward from a bottom surface of the inflow annular groove.

5. The valve timing changing device according to claim 1, wherein the sleeve comprises, as the inlet, a first inlet and a second inlet that are spaced apart around the axis, and the fitting pin is disposed so that the notch of the C-shaped leaf spring is positioned in a region away from the first inlet and the second inlet.

6. The valve timing changing device according to claim 1, wherein the sleeve comprises a communication annular groove recessed from the inner peripheral surface in a region facing the communication port, and the C-shaped leaf spring has a width dimension in a direction of the axis larger than a width dimension of the communication annular groove.

7. The valve timing changing device according to claim 1, wherein the spool comprises an end to which a drive shaft of an electromagnetic actuator engages and exerts a driving force.

8. The valve timing changing device according to claim 7, further comprising a biasing spring disposed within the sleeve to bias the spool against the driving force of the drive shaft.

9. The valve timing changing device according to claim 1, wherein the first communication port and the second communication port are located on two sides of the inlet in a direction of the axis, and the spool comprises a rod that reciprocates within the sleeve, a first valve portion that is provided on the rod to open and close a passage between the inlet and the first communication port, and a second valve portion that is provided on the rod to open and close a passage between the inlet and the second communication port.

10. The valve timing changing device according to claim 9, wherein the sleeve comprises a first discharge passage that communicates with the first communication port and is able to discharge the hydraulic oil when the first valve portion is closed, and a second discharge passage that communicates with the second communication port and is able to discharge the hydraulic oil when the second valve portion is closed.

11. The valve timing changing device according to claim 10, wherein the spool comprises a compression spring disposed between the first valve portion and the second valve portion, the first valve portion comprises:
a first fixed part fixed to the rod and having a first land capable of closing the first communication port and a first internal passage formed inside the first land; and
a first movable part movably supported along the rod and having a first lid part for opening and closing the first internal passage, the second valve portion comprises:
a second fixed part fixed to the rod and having a second land capable of closing the second communication port and a second internal passage formed inside the second land; and
a second movable part movably supported along the rod and having a second lid part for opening and closing the second internal passage, and the compression spring is disposed to exert a biasing force to close the first lid part and to close the second lid part.

12. The valve timing changing device according to claim 1, further comprising a fastening bolt that fastens the vane rotor to the camshaft, wherein the fastening bolt is formed in a cylindrical shape and comprises a passage through which the hydraulic oil passes, and the fluid control valve is disposed inside the fastening bolt.

13. The valve timing changing device according to claim 1, wherein the valve is a torque-driven and hydraulically-driven fluid control valve capable of reciprocating the hydraulic oil between the retard chamber and the advance chamber by a fluctuating torque received by the camshaft and discharging a part of the supplied hydraulic oil.

* * * * *